United States Patent
Yu et al.

(10) Patent No.: US 11,283,976 B2
(45) Date of Patent: Mar. 22, 2022

(54) CAMERA MODULE FOR CONTROLLING IRIS DIAPHRAGM USING SIGNAL CORRECTED ACCORDING TO POSITION OF LENS ASSEMBLY, ELECTRONIC DEVICE INCLUDING THE CAMERA MODULE, AND METHOD FOR OPERATING THE ELECTRONIC DEVICE

(71) Applicant: Samsung Electronics Co., Ltd., Suwon-si (KR)

(72) Inventors: Youngbok Yu, Suwon-si (KR); Dongyoul Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 379 days.

(21) Appl. No.: 16/429,453

(22) Filed: Jun. 3, 2019

(65) Prior Publication Data

US 2019/0373145 A1 Dec. 5, 2019

(30) Foreign Application Priority Data

Jun. 5, 2018 (KR) .................. 10-2018-0064656

(51) Int. Cl.
*H04N 5/225* (2006.01)
*G02B 7/10* (2021.01)
*G02B 7/02* (2021.01)

(52) U.S. Cl.
CPC .......... *H04N 5/2254* (2013.01); *G02B 7/021* (2013.01); *G02B 7/102* (2013.01); *H04N 5/2252* (2013.01)

(58) Field of Classification Search
CPC .... H04N 5/2254; H04N 5/2252; H04N 5/238; H04N 5/2253; G02B 7/021; G02B 7/102;
(Continued)

(56) References Cited

U.S. PATENT DOCUMENTS 7,259,792 B2 * 8/2007 Terada ................ H04N 5/2254
348/368
7,922,403 B2 4/2011 Kihara
(Continued)

FOREIGN PATENT DOCUMENTS

JP 2004-212581 A 7/2004
JP 2009-058966 A 3/2009
(Continued)

OTHER PUBLICATIONS

International Search Report dated Sep. 20, 2019, issued in International Patent Application No. PCT/KR2019/006633.
(Continued)

*Primary Examiner* — Mekonnen D Dagnew
(74) *Attorney, Agent, or Firm* — Jefferson IP Law, LLP

(57) ABSTRACT

A camera module is provided. The camera module includes a housing, a lens assembly including at least one lens, an iris diaphragm disposed over the lens and configured to adjust an amount of external light incident on the lens, an iris diaphragm magnet member disposed on a surface of the lens assembly for adjusting a movement of the iris diaphragm, a coil disposed on a surface of the housing facing the iris diaphragm magnet member, at least one sensor disposed on the surface and sensing a magnetic force of the iris diaphragm magnet member, a lens driving unit moving the lens assembly, and control circuitry configured to detect a magnetic force between the moved lens assembly and the surface by using the sensor, determine a position of the lens assembly relative to the surface based at least on the magnetic force, correct a signal for controlling an amount of electric current supplied to the coil according to the position, and adjust an aperture ratio of the iris diaphragm through the iris diaphragm magnet member by using an electromagnetic
(Continued)

force output through the coil according to the corrected signal.

17 Claims, 22 Drawing Sheets

(58) Field of Classification Search
CPC ........ G02B 7/08; G02B 27/646; G02B 5/005; G03B 3/10; G03B 5/00; G03B 30/00; G03B 2205/0015; G03B 2205/0069; G03B 9/02
See application file for complete search history.

(56) References Cited

U.S. PATENT DOCUMENTS

| | | | |
|---|---|---|---|
| 9,151,965 B2 | 10/2015 | Lim et al. | |
| 9,372,352 B2 | 6/2016 | Lim et al. | |
| 9,467,624 B2 | 10/2016 | Yeo | |
| 9,807,312 B1 | 10/2017 | Kim et al. | |
| 9,927,600 B2 | 3/2018 | Goldenberg et al. | |
| 9,942,462 B2 * | 4/2018 | Park | G02B 7/365 |
| 9,955,079 B2 | 4/2018 | Yeo | |
| 9,964,778 B2 | 5/2018 | Kim et al. | |
| 9,998,681 B2 | 6/2018 | Campbell et al. | |
| 2007/0201866 A1 | 8/2007 | Kihara | |
| 2015/0138639 A1 | 5/2015 | Lim et al. | |
| 2015/0212293 A1 | 7/2015 | Bang et al. | |
| 2015/0286034 A1 * | 10/2015 | Suzuki | H04N 5/23209 348/294 |
| 2016/0252746 A1 | 9/2016 | Kim et al. | |
| 2016/0381295 A1 | 12/2016 | Yeo | |
| 2017/0324892 A1 | 11/2017 | Kim et al. | |
| 2017/0374255 A1 | 12/2017 | Campbell et al. | |
| 2018/0024329 A1 | 1/2018 | Goldenberg et al. | |
| 2018/0069995 A1 * | 3/2018 | Lim | H04N 5/23245 |
| 2018/0146124 A1 | 5/2018 | Choi et al. | |
| 2018/0146130 A1 | 5/2018 | Lee et al. | |
| 2018/0196238 A1 | 7/2018 | Goldenberg et al. | |

FOREIGN PATENT DOCUMENTS

| | | |
|---|---|---|
| KR | 10-1337975 B1 | 12/2013 |
| KR | 10-2017-0118943 A | 10/2017 |

OTHER PUBLICATIONS

European Search Report dated May 21, 2021, issued in European Application No. 19814250.7.

* cited by examiner

CAMERA MODULE FOR CONTROLLING IRIS DIAPHRAGM USING SIGNAL CORRECTED ACCORDING TO POSITION OF LENS ASSEMBLY, ELECTRONIC DEVICE INCLUDING THE CAMERA MODULE, AND METHOD FOR OPERATING THE ELECTRONIC DEVICE

CROSS-REFERENCE TO RELATED APPLICATION(S)

This application is based on and claims priority under 35 U.S.C. § 119(a) of a Korean patent application number 10-2018-0064656, filed on Jun. 5, 2018, in the Korean Intellectual Property Office, the disclosure of which is incorporated by reference herein in its entirety.

BACKGROUND

1. Field

The disclosure relates to a camera module of an electronic device.

2. Description of Related Art

In recent years, various forms of portable electronic devices, such as smartphones, tablet PCs, and the like, have been widely used. These portable electronic devices may include photographing functions. In this regard, the portable electronic devices may include a camera module.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a camera module having an iris diaphragm module therein, an electronic device including the camera module, and a method for operating the electronic device.

A conventional portable electronic device has a limited size and thickness in consideration of portability and the like. Therefore, a camera module (or camera structure) included in the portable electronic device also has a limited size and thickness. In this regard, a camera module of a conventional portable electronic device has been manufactured by adopting a camera module that does not include some components, such as an iris diaphragm module.

Because a camera module without an iris diaphragm module cannot smoothly adjust the amount of light, photographing performance is deteriorated or a photographing function is limited.

Additional aspects will be set forth in part in the description which follows and, in part, will be apparent from the description, or may be learned by practice of the presented embodiments.

In accordance with an aspect of the disclosure, a camera module is provided. The camera module includes a housing, a lens assembly (or lens module, or lens structure) that is received in the housing and that includes at least one lens, an iris diaphragm that is disposed over the at least one lens and that adjusts an amount of external light incident on the at least one lens, an iris diaphragm magnet member that is disposed on one surface of the lens assembly and that adjusts the iris diaphragm, a coil disposed on one surface of the housing to face the iris diaphragm magnet member, at least one sensor that is disposed on the one surface of the housing and that senses a magnetic force (or a magnetic field) of the iris diaphragm magnet member, a lens driving unit that moves the lens assembly, and control circuitry. The control circuitry is configured to detect a magnetic force between the lens assembly moved by the lens driving unit and the one surface of the housing by using the sensor, determine a position of the lens assembly relative to the one surface of the housing, based at least on the magnetic force, correct a signal for controlling the coil according to the position of the lens assembly, and adjust the iris diaphragm through the iris diaphragm magnet member by using an electromagnetic force output through the coil according to the corrected signal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modification of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
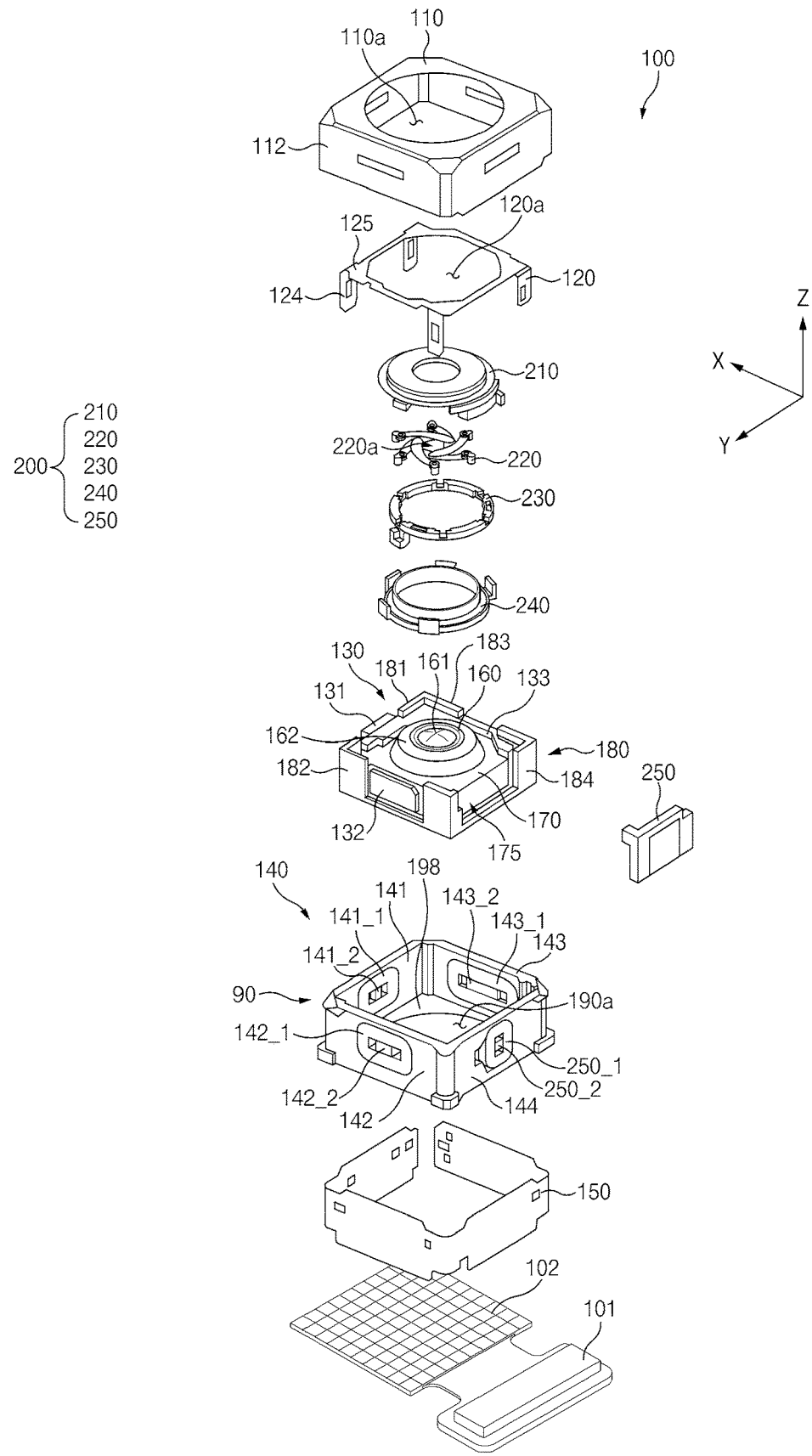
FIG. 1 is a view illustrating an example of an exploded perspective view of a camera module according to an embodiment of the disclosure.

FIG. 1 is a view illustrating an example of an exploded perspective view of a camera module according to an embodiment of the disclosure.

Referring to FIG. 1, the camera module 100 according to an embodiment may include a lens assembly 130 and a lens driving unit or an actuator structure (e.g., a first carrier 170, a second carrier 180, an assembly housing 140, a printed circuit board (PCB) 150, and the like). According to various embodiments, the camera module 100 may include a shield can 110, a cover 120 (or an optical image stabilization (OIS) cover), the lens assembly 130, and the actuator structure.

The camera module 100 according to an embodiment may include the housing (or the assembly housing) 140, the lens assembly 130 that is received in the housing 140 and that includes at least one lens, an iris diaphragm (or an iris diaphragm module) 200 that is disposed over the at least one lens and that is capable of adjusting the amount of external light incident on the at least one lens, a magnet (or an iris diaphragm driving member) that is disposed on one surface of the lens assembly 130 and that is capable of adjusting the iris diaphragm, a coil (or an iris diaphragm coil) disposed on one surface of the housing 140 to face the magnet, a sensor (or a Hall sensor) that is disposed on the one surface of the housing 140 and that is capable of sensing the magnetic force (or magnetic field) of the magnet, and the lens driving unit that is capable of moving the lens assembly (e.g., a lens driving module related to OIS, a lens driving module related to auto-focusing (AF) adjustment, and the like). Additionally, the camera module 100 may include control circuitry 101 (or a processor) related to camera function control. The control circuitry 101 may be configured to detect the magnetic force between the lens assembly 130 moved by the lens driving unit and the one surface of the housing 140 by using the sensor, determine the position of the lens assembly 130 relative to the one surface of the housing 140, based at least on the magnetic force, correct (or compensate) a signal for controlling the coil according to the position of the lens assembly 130, and adjust the iris diaphragm through the magnet, by using an electromagnetic force output through the coil according to the corrected (or compensated) signal.

The above-described camera module 100 may linearly change a variation in the size of an aperture 220a formed by blades of the iris diaphragm module 200, by disposing at least a part of the iris diaphragm module 200 over the lens assembly 130 and linearly changing the positions of the blades of the iris diaphragm module 200. Accordingly, the camera module 100 supports seamlessly taking an image while changing the aperture ratio of the aperture 220a in the process of taking a preview image, a moving image, a panoramic image, or the like.

The shield can 110 may have a shape that entirely covers the camera module 100 from top to bottom. For example, the shield can 110 may include an upper surface 111 and shield can sidewalls 112 disposed at the edge of the upper surface 111 and may be open at the bottom. The shield can 110 may have, in the upper surface 111 thereof, a shield can hole 110a of a predetermined size through which at least part of a lens 161 is exposed. The shield can sidewalls 112 may be fastened with the edge of the assembly housing (or the housing) 140 of the camera module 100 and may protect or fix components (e.g., the cover 120, the iris diaphragm module 200, the lens assembly 130, the first carrier 170, the second carrier 180, the printed circuit board 150, and the like) that are positioned in the assembly housing 140. The shield can 110 may be formed of, for example, metal or a material (e.g., metal, reinforced plastic, or the like) with a specified hardness or more.

The cover 120 may be disposed between the shield can 110 and the iris diaphragm module 200 and may prevent separation of at least a part of the iris diaphragm module 200 and at least a part of the lens assembly 130 in one direction (e.g., the Z-axis direction or the upward direction). In this regard, the cover 120 may include an upper substrate 125 and leads 124. The upper substrate 125 may have a circular or polygonal (e.g., rectangular) strap shape with an empty space in the center and may include, in the center thereof, a cover hole 120a of a predetermined size through which the aperture 220a of the iris diaphragm module 200 and at least part of the lens 161 are exposed. The upper substrate 125 of the cover 120 may be spaced apart upward from the iris diaphragm module 200 by a predetermined distance to enable a vertical movement of the iris diaphragm module 200.

Each of the leads 124 may be formed in the vertically downward direction from one side (e.g., an edge) of the upper substrate 125 to have a predetermined length and width. According to an embodiment, the lead 124 may have a loop shape with an empty space in the center and may be coupled to one side of at least one of the first carrier 170 or the second carrier 180 on which the lens assembly 130 is mounted.

The iris diaphragm module 200 may include an iris diaphragm cover 210, an iris diaphragm blade part 220, an iris diaphragm ring 230, an iris diaphragm holder 240, and an iris diaphragm driving member 250. The iris diaphragm cover 210 may be disposed between the cover 120 and the iris diaphragm blade part 220 and may prevent separation of the iris diaphragm blade part 220. For example, the iris diaphragm cover 210 may prevent separation of the iris diaphragm blade part 220 in the upward direction while the size (or the aperture ratio) of the aperture 220a of the iris diaphragm blade part 220 is changed.

The iris diaphragm blade part 220 may include a plurality of blades, and at least one of the blades may be moved by rotation of the iris diaphragm ring 230 to adjust the size of the aperture 220a. The iris diaphragm blade part 220 may include, for example, two or six blades. Alternatively, the iris diaphragm blade part 220 may include N blades (N being a natural number of 3, 4, 5, or the like).

The iris diaphragm ring 230 may be disposed between the iris diaphragm blade part 220 and the iris diaphragm holder 240. The iris diaphragm ring 230 may rotate about the iris diaphragm holder 240 in a predetermined direction (e.g. to the left or right with respect to the drawing) according to a movement of the iris diaphragm driving member 250 while fixing sides of the blades of the iris diaphragm blade part 220. When the iris diaphragm ring 230 rotates, the arrangement state of the blades of the iris diaphragm blade part 220, which are fixed to the iris diaphragm ring 230 at the sides thereof, may be changed. Therefore, the size of the aperture 220a may be changed.

The iris diaphragm blade part 220 and the iris diaphragm ring 230 may be mounted on the iris diaphragm holder 240. The iris diaphragm holder 240 may support the iris diaphragm ring 230 while the iris diaphragm ring 230 is rotated in one direction. The iris diaphragm holder 240 may fix an opposite side of the iris diaphragm blade part 220. Accordingly, the blades of the iris diaphragm blade part 220 may be rotated in a specified direction by a movement of the iris diaphragm ring 230.

The iris diaphragm driving member 250 may be disposed on one side on the first carrier 170 or the second carrier 180 and may transmit a predetermined force to the iris diaphragm holder 240 while facing one side of the iris diaphragm holder 240. For example, when the iris diaphragm driving member 250 moves with one side of the iris diaphragm driving member 250 brought into contact with one side of the iris diaphragm ring 230, the iris diaphragm ring 230 may be rotated along the iris diaphragm holder 240 in a predetermined direction. At this time, the iris diaphragm blade part 220, one side of which is mounted on the iris diaphragm ring 230, rotates in one direction about an axis fixed to the iris diaphragm holder 240, and therefore the aperture ratio of the aperture 220a may be changed by the blades of the iris diaphragm blade part 220.

The lens assembly 130 may include the lens 161 and a lens barrel 162. The first carrier 170 and the second carrier 180 may be disposed on one side of the lens assembly 130. Some components (e.g., a first magnet member 131 and a second magnet member 132) of the lens driving module related to OIS, some components (e.g., a third magnet member 133) of the lens driving module related to AF, and some components (e.g., the iris diaphragm driving member 250) related to driving of the iris diaphragm module 200 may be disposed on sides of the first carrier 170 and the second carrier 180.

The iris diaphragm ring 230 and the iris diaphragm holder 240 may be disposed on one side of the lens barrel 162. Alternatively, the iris diaphragm ring 230 and the iris diaphragm holder 240 may be disposed on the first carrier 170 (or the second carrier 180) where the lens barrel 162 is mounted.

The lens 161 may collect light incident from the outside and may transport the collected light to an image sensor 102 disposed under the lens barrel 162. The lens 161 may be implemented with one or more lens. The lens 161 may be fixed to one side of the lens barrel 162.

The lens barrel 162 may surround the lens 161 mounted therein and may provide a light path along which light incident through the lens 161 is transported to the image sensor 102. In this regard, the lens barrel 162 may have an empty space in the center and may be open at the bottom such that the image sensor 102 is exposed. The top side 160 of the lens barrel 162 may be formed in a shape corresponding to the shape of the lens 161. The lens barrel 162 may be fixedly mounted on one side of the first carrier 170. Accordingly, the lens barrel 162 and the lens 161 may be moved as the first carrier 170 moves.

The first carrier 170 may have an empty space inside, in which the lens barrel 162 is disposed. The iris diaphragm module 200 may be fixedly mounted on an upper part of the first carrier 170. The first magnet member 131 and the second magnet member 132 (e.g., a magnet member for optical image stabilization) may be disposed on at least two outsides of the first carrier 170. The at least two outsides may include sides that share an edge. The first carrier 170 may include, on one side thereof, an iris diaphragm driving rail 175 to which some components of the iris diaphragm module 200, for example, the iris diaphragm driving member 250 is coupled.

The first magnet member 131 and the second magnet member 132 for OIS may be paired with coils related to OIS that are disposed on the second carrier 180 (e.g., coils 141_1 and 142_1 disposed on sides of the assembly housing 140). For example, the first magnet member 131 and the second magnet member 132 may be used to move the first carrier 170, to which the lens barrel 162 is fixed, in the X-axis and Y-axis directions (or two horizontal axis directions when the upward direction in which the shield can 110 is disposed is defined as a vertical axis direction).

The first carrier 170 may be mounted in the central portion of the second carrier 180. The first carrier 170 may be moved inside the second carrier 180 in the X-axis or Y-axis direction. The second carrier 180 may include one or more carrier sidewalls. For example, the second carrier 180 may include a first carrier sidewall 181 formed to expose the first magnet member 131 that operates to move the first carrier 170, on which the lens barrel 162 is mounted, in the X-axis direction and a second carrier sidewall 182 formed to expose the second magnet member 132 that operates to move the first carrier 170, on which the lens barrel 162 is mounted, in the Y-axis direction. Furthermore, the second carrier 180 may include a third carrier sidewall 183 having an outside on which is disposed the third magnet member 133 used to move the lens assembly 130 in the Z-axis direction. In addition, the second carrier 180 may include a fourth carrier sidewall 184 formed to expose the iris diaphragm driving rail 175, which is on one side of the first carrier 170, to the outside.

The iris diaphragm driving member 250 may be coupled with the iris diaphragm driving rail 175, which is on the one side of the first carrier 170, through a space formed on a side of the sidewall 184 of the second carrier 180. The iris diaphragm driving member 250 may be disposed on the same axis as the X-axis (or the first axis).

The assembly housing 140 may include a seating part 198 on which the above-described components (e.g., the cover 120, the iris diaphragm module 200, the lens assembly 130, the first carrier 170, and the second carrier 180) are mounted and a housing sidewall part 90 disposed to surround the above-described components. The seating part 198 may include, in the center thereof, a seating part hole 190a through which the central part of the lens assembly 130 is exposed in the downward direction. For example, the image sensor 102 may be disposed below the seating part hole 190a.

The housing sidewall part 90 may be disposed on the edge of the seating part 198 while sharing edges. The housing sidewall part 90 may include, for example, a first housing sidewall 141 on which is disposed the first coil 141_1 interworking with the first magnet member 131 disposed on the first carrier 170 to move the lens assembly 130 in the X-axis direction, a second housing sidewall 142 on which is disposed the second coil 142_1 interworking with the second magnet member 132 disposed on the first carrier 170 to move the lens assembly 130 in the Y-axis direction, a third housing sidewall 143 on which is disposed a third coil 143_1 interworking with the third magnet member 133 disposed to move the lens assembly 130 in the Z-axis direction, and a fourth housing sidewall 144 on which is disposed an iris diaphragm coil 250_1 interworking with the iris diaphragm driving member 250.

The housing sidewalls 141, 142, 143, and 144 may be fastened with the shield can sidewalls 112 and may protect the above-described components inside, which are related to the camera module 100. The assembly housing 140 may include, on sides thereof, first to third Hall sensors 141_2, 142_2, and 143_2 and at least one iris diaphragm Hall sensor 250_2. The first Hall sensor 141_2 may collect sensor information according to a movement of the first carrier 170 in the X-axis direction. The second Hall sensor 142_2 may collect sensor information according to a movement of the first carrier 170 in the Y-axis direction. The third Hall sensor 143_2 may collect sensor information according to a movement of the lens assembly 130 in the Z-axis direction. The iris diaphragm Hall sensor 250_2 may collect sensor information according to movements of the lens assembly 130 in the X-axis, Y-axis, and Z-axis directions. The first to third Hall sensors 141_2, 142_2, and 143_2 and the iris diaphragm Hall sensor 250_2 may be electrically connected to the printed circuit board 150 and may transfer the collected sensor information to a processor of the camera module 100 or a processor of an electronic device through the printed circuit board 150.

The printed circuit board 150 may supply signals (e.g., electric currents) to the coils 141_1, 142_1, 250_1, and 143_1 disposed on the assembly housing 140. The printed circuit board 150 may be connected to a first processor related to driving of the camera module 100 or a second processor of an electronic device in which the camera module 100 is mounted. The printed circuit board 150 may supply signals of specified magnitudes (e.g., electric currents of specified magnitudes) to the coils 141_1, 142_1, 250_1, and 143_1 included in the assembly housing 140, under the control of at least one of the first processor and the second processor. According to an embodiment, the printed circuit board 150 may receive sensing values from the Hall sensors 141_2, 142_2, 250_2, and 143_2 disposed on the assembly housing 140 and may supply signals corresponding to the sensing values to the respective coils 141_1, 142_1, 250_1, and 143_1. Additionally, the camera module 100 may further include the image sensor 102 (e.g., a memory device) that collects images. The image sensor 102 may be disposed to face the lens 161 through the seating part hole 190a in the bottom of the assembly housing 140.

The above-described camera module 100 of the disclosure may provide a structure in which the iris diaphragm module 200 is disposed over the lens assembly 130 and the aperture ratio of the iris diaphragm blade part 220 included in the iris diaphragm module 200 is able to be linearly changed. Accordingly, the camera module 100 may obtain a stable image (or, a moving image or a panoramic image), based on the linearly changed aperture ratio.

According to various embodiments, the at least one sensor may include a plurality of sensors that obtain sensing information relating to the position of the iris diaphragm magnet member, and the control circuitry 101 may be configured to identify the position of the iris diaphragm magnet member, based on sensing information obtained from the plurality of sensors and calculate a signal value required for the iris diaphragm magnet member to move to the position corresponding to a set aperture value.

According to various embodiments, the control circuitry 101 may be configured to obtain sensing information according to the position of the iris diaphragm magnet member, calculate a signal value corresponding to the sensing information, based on a lookup table stored in a memory of the electronic device, and apply an electric current corresponding to the calculated signal value to the coil.

Figure 2A:
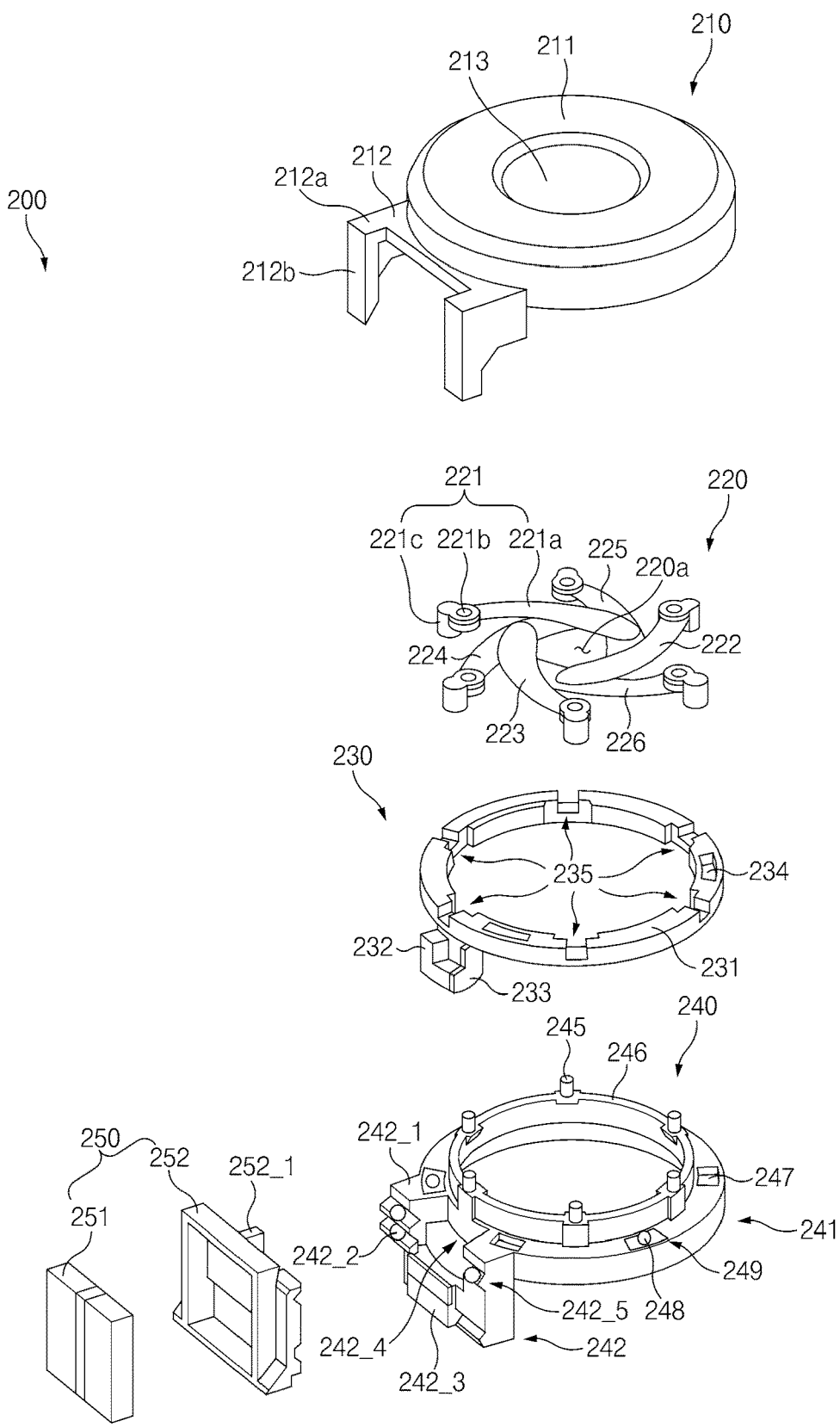
FIG. 2A is a view illustrating an example of an exploded perspective view of an iris diaphragm module according to an embodiment of the disclosure.

FIG. 2A is a view illustrating an example of an exploded perspective view of the iris diaphragm module according to an embodiment of the disclosure.

Figure 2B:
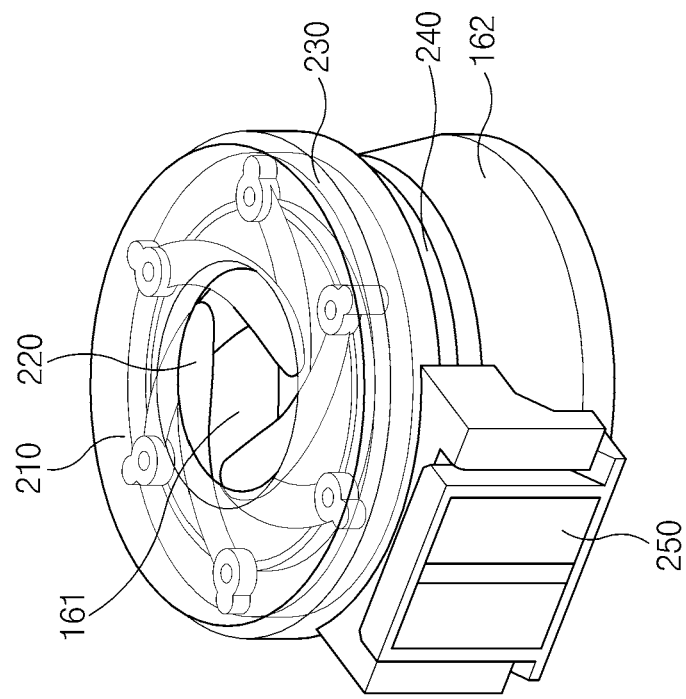
FIG. 2B is a view illustrating an example of some components of a camera module according to an embodiment of the disclosure.
Figure 2B:
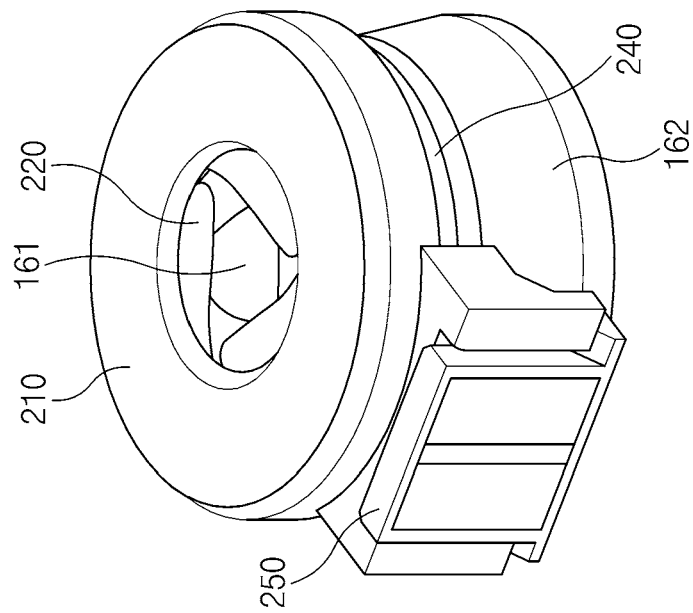

FIG. 2B is a view illustrating an example of some components of a camera module according to an embodiment of the disclosure.

Referring to FIGS. 1, 2A, and 2B, the iris diaphragm module 200 may include the iris diaphragm cover 210, the iris diaphragm blade part 220, the iris diaphragm ring 230, the iris diaphragm holder 240, and the iris diaphragm driving member 250. The iris diaphragm holder 240 may be fixedly mounted on, for example, the lens assembly 130 (e.g., the lens barrel 162 of the lens assembly 130) or the first carrier 170. The iris diaphragm ring 230 may be mounted on the iris diaphragm holder 240 and may perform a rotary motion within a predetermined angle range by the iris diaphragm driving member 250. The iris diaphragm blade part 220 may be mounted on the iris diaphragm ring 230, and the arrangement state of the iris diaphragm blade part 220 may be changed according to a movement of the iris diaphragm ring 230. Therefore, the aperture ratio of the aperture 220a may be changed.

The iris diaphragm cover 210 may include a first cover part 211 and a second cover part 212.

For example, the first cover part 211 may be formed in the shape of a substrate or a cap that has, in the center, a hole 213 with a predetermined size or shape (e.g., a circular shape or a polygonal shape). The size of the hole 213 may correspond to the size of the lens 161, or may be greater than the size of the lens 161. A sidewall of the hole 213 in the center of the first cover part 211 may be formed to have a predetermined inclination angle from top to bottom, thus improving the amount of incident light. For example, the sidewall of the hole 213 may have a shape (e.g., the shape of part of a funnel) in which the horizontal cross-sectional area becomes gradually narrower from top to bottom.

The second cover part 212 may be provided on one side of the first cover part 211. The second cover part 212 may include, for example, an upper substrate 212a that is connected to the first cover part 211 and that has a predetermined width and leads 212b disposed at opposite edges of the upper substrate 212a in the same direction as the direction in which an outer circumferential portion of the first cover part 211 is formed. The leads 212b may be spaced apart from each other by a predetermined distance with respect to the center of the second cover part 212. For example, the leads 212b may each have two sidewalls that extend different lengths from the corresponding edge of the upper substrate 212a in the direction of the outer circumferential portion and share at least part of an edge. Accordingly, at least one of the leads 212b may have the shape of "7" when viewed from a side, and the leads 212b may form an inverted U-shape when viewed from the front. The first cover part 211 may be disposed to cover at least part of the iris diaphragm holder 240, and the second cover part 212 may cover one side of the iris diaphragm holder 240 and at least part of the iris diaphragm driving member 250.

The iris diaphragm blade part 220 may be disposed under the iris diaphragm cover 210. Alternatively, the iris diaphragm blade part 220 may be disposed inside the first cover part 211 of the iris diaphragm cover 210 that has a cap shape. The iris diaphragm blade part 220 may include a plurality of blades 221, 222, 223, 224, 225, and 226. The iris diaphragm blade part 220 may include, for example, a first group of blades 221, 222, and 223 disposed on a first horizontal plane (e.g., a plane parallel to an upper surface of the iris diaphragm ring 230) and a second group of blades 224, 225, and 226 disposed below the first horizontal plane so as to be parallel to the first horizontal plane. The first group of blades 221, 222, and 223 and the second group of blades 224, 225, and 226 may be alternately disposed to form the aperture 220a in the center. The aperture 220a may be vertically aligned with the hole 213 of the iris diaphragm cover 210.

According to various embodiments, the plurality of blades 221, 222, 223, 224, 225, and 226 may have the same shape. For example, the first blade 221 may include a body 221a, a connecting part 221b, and a mounting part 221c, and the other blades may have the same structure as the first blade 221. The body 221a may have, for example, a curved blade shape with a predetermined width and thickness. The connecting part 221b may be disposed at one end of the body 221a and connected to the body 221a. The connecting part 221b may have, in the center, a through-hole vertically formed through the connecting part 221b. The through-hole may be combined with a protrusion 245 formed on the iris diaphragm holder 240. The connecting part 221b may rotate about the protrusion 245 with which the through-hole is combined. The mounting part 221c may extend from the connecting part 221b and may protrude a predetermined length in the opposite direction to the direction in which the body 221a is disposed. The mounting part 221c may be mounted in an iris diaphragm recess 235 formed on the iris diaphragm ring 230. Accordingly, while the iris diaphragm ring 230 rotates, the mounting part 221c mounted in the iris diaphragm recess 235 may rotate, and the connecting part 221b and the body 221a that are connected to the mounting part 221c may rotate.

The iris diaphragm ring 230 may be disposed between the iris diaphragm blade part 220 and the iris diaphragm holder 240. According to an embodiment, the iris diaphragm ring 230 may include a ring 231 having a circular or polygonal strap shape and a rotation support part 232 protruding from one side of the ring 231. The ring 231 may include a plurality of iris diaphragm recesses 235 that are lower than the other parts of the ring 231 and at least one ring yoke 234. The mounting parts 221c of the blades 221, 222, 223, 224, 225, and 226 may be mounted in the iris diaphragm recesses 235. The at least one ring yoke 234 may be vertically aligned with at least one ring magnet 247 disposed on the iris diaphragm holder 240. The rotation support part 232 may extend from the one side of the ring 231 and may be disposed on the periphery of the ring 231. The rotation support part 232 may protrude in an outward direction from the center of the ring 231. The rotation support part 232 may include, on one side thereof, a metal member 233 on which a magnetic attraction force is exerted by the iris diaphragm driving member 250. The rotation support part 232 may be mounted in a holder support part 242 of the iris diaphragm holder 240 and may perform a rotary motion within a predetermined angle range by a movement of the iris diaphragm driving member 250. While the rotation support part 232 is rotated by the iris diaphragm driving member 250, the ring 231 connected to the rotation support part 232 may be rotated, and the iris diaphragm blades 221, 222, 223, 224, 225, and 226, the mounting parts 221c of which are mounted in the iris diaphragm recesses 235, may be uniformly moved in one direction by the ring 231. Accordingly, the aperture 220a of the iris diaphragm blade part 220 may be linearly changed according to the linear movement of the iris diaphragm driving member 250.

The iris diaphragm holder 240 may include a holder body 241 on which the ring 231 of the iris diaphragm ring 230 is mounted and the holder support part 242 provided on one side of the holder body 241. The holder body 241 may have a shape corresponding to the shape of the iris diaphragm ring 230. For example, the holder body 241 may have a circular or polygonal strap shape. The holder body 241 may include the at least one ring magnet 247 disposed on one side thereof. For example, the holder body 241 may include as many ring magnets 247 as ring yokes 234 disposed on the iris diaphragm ring 230. The holder body 241 may include at least one guide ball 248 and a guide groove 249 in which the guide ball 248 is mounted. The guide ball 248 may be mounted in the guide groove 249 and may be moved along the guide groove 249 in one direction. The iris diaphragm ring 230 may be placed on the guide ball 248, and the iris diaphragm ring 230 may perform a rotary motion according to rolling (movement) of the guide ball 248. The holder body 241 may include a circular or polygonal sidewall 246 (e.g., a cylindrical sidewall) that extends upward from an inner circumferential portion thereof by a predetermined height. When the iris diaphragm ring 230 is mounted on the sidewall 246, an outer circumferential surface of the sidewall 246 may be disposed to face an inner circumferential surface of the iris diaphragm ring 230. The holder body 241 may include a plurality of protrusions 245 protruding upward from an upper surface of the sidewall 246. The protrusions 245 may be fastened with the connecting parts 221*b* of the iris diaphragm blade part 220, and the iris diaphragm blades 221, 222, 223, 224, 225, and 226 rotate about the protrusions 245.

The holder support part 242 may protrude from one side of the holder body 241 in one direction (e.g., the direction in which the iris diaphragm driving member 250 is disposed). The holder support part 242 may have a U-shape, and an upper side 242_1 of the holder support part 242 may be fixedly connected to at least one point of the holder body 241. The holder support part 242 may include a mounting recess or hole 242_4 in which the rotation support part 232 of the iris diaphragm ring 230 is mounted. The holder support part 242 may include a holder yoke 242_3, at least one driving member guide ball 242_2, and at least one driving member guide groove 242_5. While the holder support part 242 is moved in one direction by the iris diaphragm driving member 250, the driving member guide ball 242_2 may move along the driving member guide groove 242_5 to reduce the frictional force between the iris diaphragm driving member 250 and the holder support part 242 or guide the moving direction. The holder yoke 242_3 may correspond to a magnet member included in the iris diaphragm driving member 250 and may support a motion of the iris diaphragm driving member 250.

The iris diaphragm driving member 250 may include a member fixing part 252 that is mounted on the holder support part 242 and that performs a motion along the driving member guide ball 242_2 and an iris diaphragm magnet member 251 fixedly mounted in the member fixing part 252. The iris diaphragm magnet member 251 may have a predetermined shape corresponding to the shape of the inside of the member fixing part 252 such that the iris diaphragm magnet member 251 is fixedly mounted in the member fixing part 252. The iris diaphragm magnet member 251 may include a magnet member having two poles divided from each other with respect to the center of the magnet member. The direction or magnitude of the magnetic force of the iris diaphragm magnet member 251 may be changed by the iris diaphragm coil 250_1 provided on the assembly housing 140. Accordingly, a movement of the iris diaphragm driving member 250 including the iris diaphragm magnet member 251 may be changed by the iris diaphragm coil 250_1. The moving direction of the iris diaphragm magnet member 251 may be the same as that of the first magnet member 131 related to optical image stabilization.

Figure 2C:
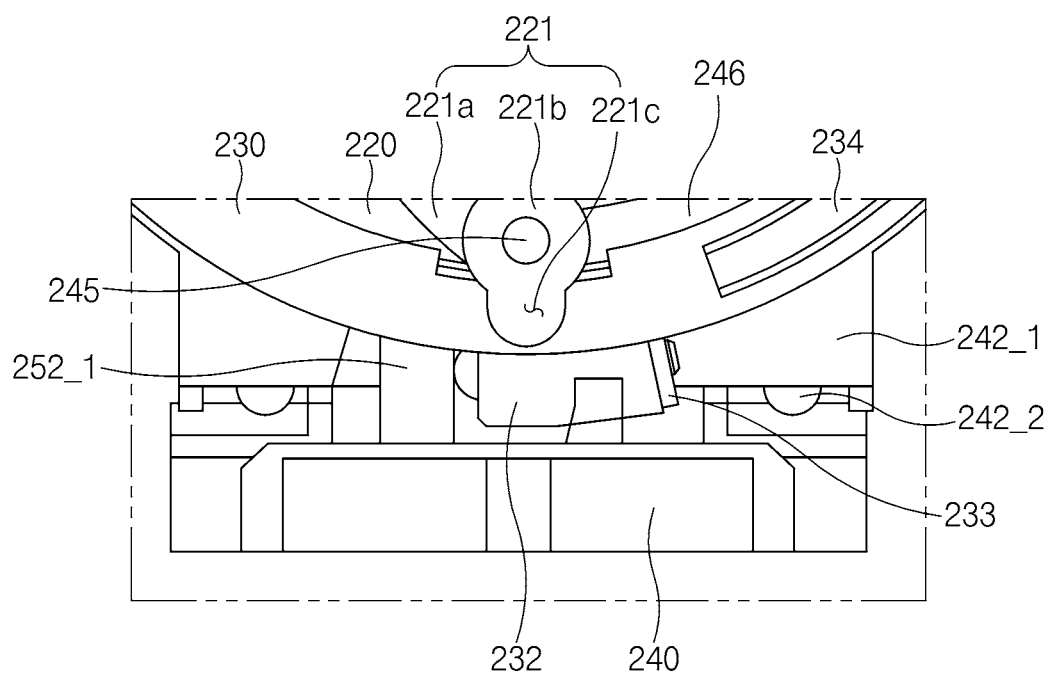
FIG. 2C is a detailed view illustrating a partial area of a camera module according to an embodiment of the disclosure.
Figure 2C:
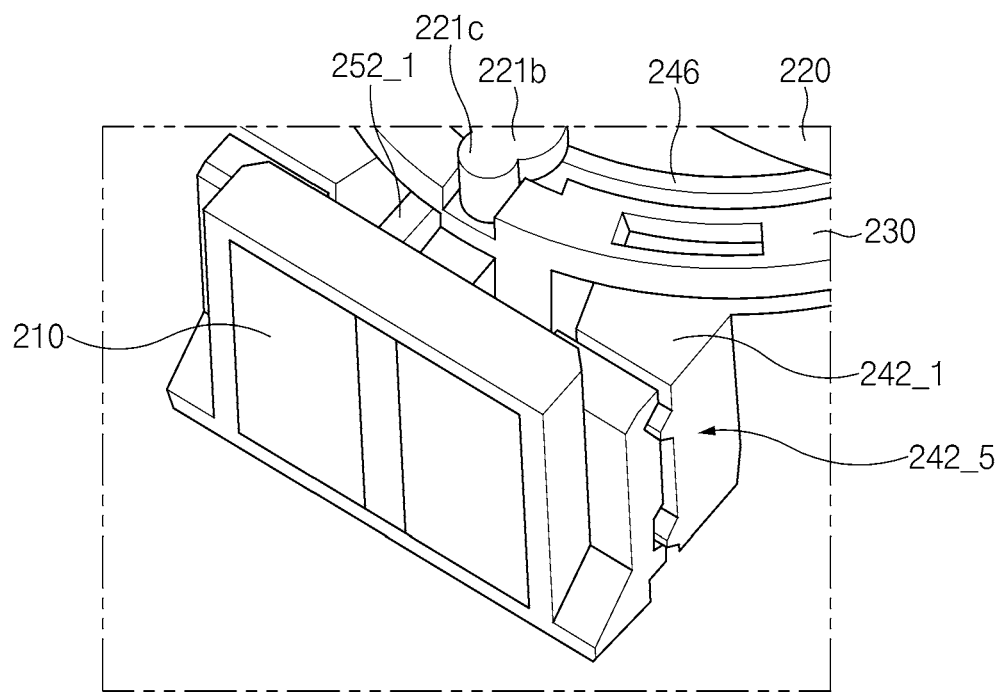

FIG. 2C is a detailed view illustrating a partial area of a camera module according to an embodiment of the disclosure.

Referring to FIG. 2C, the iris diaphragm driving member 250 may include a latch 252_1 that makes contact with one side of the rotation support part 232. The iris diaphragm driving member 250 may move the rotation support part 232 in one direction by the latch 252_1 while moving. When the rotation support part 232 rotates the ring 231, the mounting parts 221*c* of the blades 221, 222, 223, 224, 225, and 226 mounted in the iris diaphragm recesses 235 may rotate, and the bodies 221*a* connected to the connecting parts 221*b* may rotate according to the rotation of the mounting parts 221*c* to change the aperture ratio of the aperture 220*a*. The metal member 233 disposed on the rotation support part 232 may have a property of performing a motion in one direction by the magnetic force of the magnet member disposed in the iris diaphragm driving member 250. Accordingly, while the iris diaphragm driving member 250 rotates in one direction and then returns to the original position, the metal member 233 may be moved by the magnetic force of the iris diaphragm driving member 250 to return the iris diaphragm ring 230 to the original position.

Figure 3:
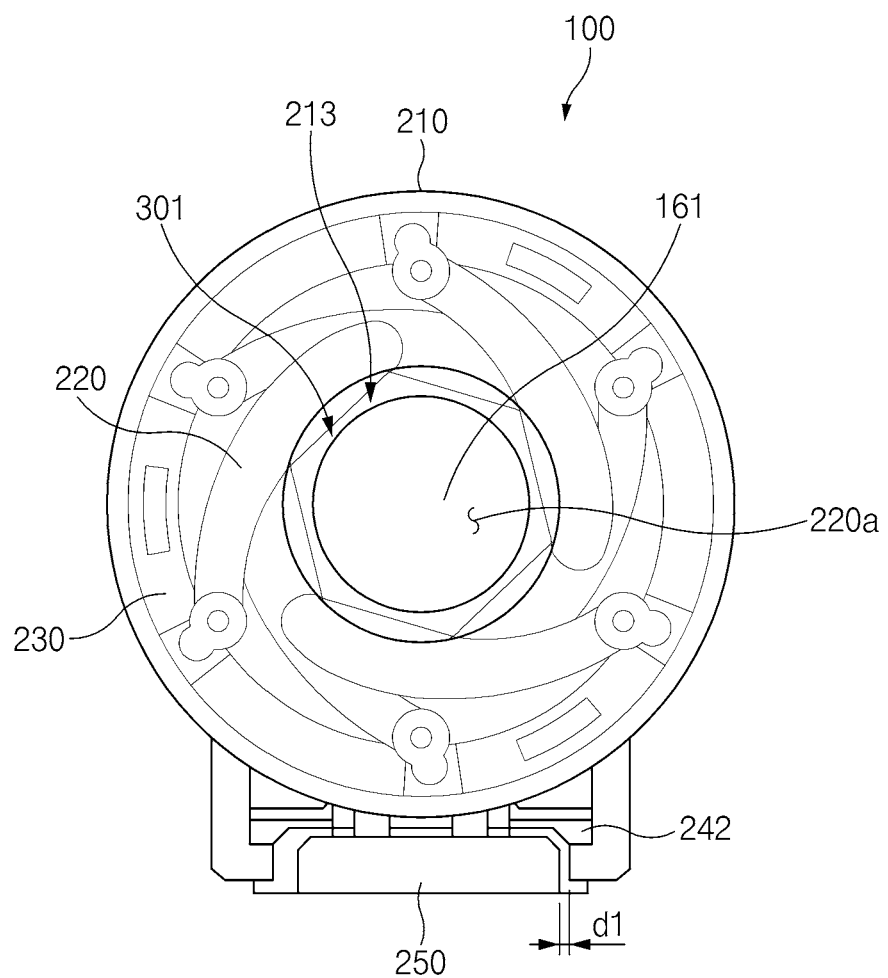
FIG. 3 is a view illustrating a first state of a camera module of a first type according to an embodiment of the disclosure.

FIG. 3 is a view illustrating a first state of a camera module of a first type according to an embodiment of the disclosure.

Referring to FIGS. 1, 2A, and 3, the camera module 100 of the first type may include, for example, the camera module described above with reference to FIGS. 1, 2A, 2B, and 2C, in which the camera module has six iris diaphragm blades. In the case of the camera module 100 of the first type, the aperture ratio of the aperture 220*a* of the iris diaphragm blade part 220 may have a first size (e.g., a maximum size that can be formed by the iris diaphragm blade part 220) in a first state 301. In this regard, the iris diaphragm driving member 250 of the camera module 100 of the first type may be located in a first position (e.g., a position where the gap between the iris diaphragm driving member 250 and the holder support part 242 is equal to a first gap of d1). According to various embodiments, in the first state 301 of the camera module 100 of the first type, no signal may be supplied to the iris diaphragm coil 250_1, or a signal of specified minimum magnitude (e.g., an electric current value of minimum magnitude) may be supplied to the iris diaphragm coil 250_1, so that the arrangement state of the blades on the iris diaphragm ring 230 may have an initial state. Accordingly, in the first state 301 of the camera module 100 of the first type, the aperture ratio of the aperture 220*a* formed by the iris diaphragm blade part 220 disposed over the lens 161 may be greater than the size of the hole 213 of the iris diaphragm cover 210.

Figure 4:
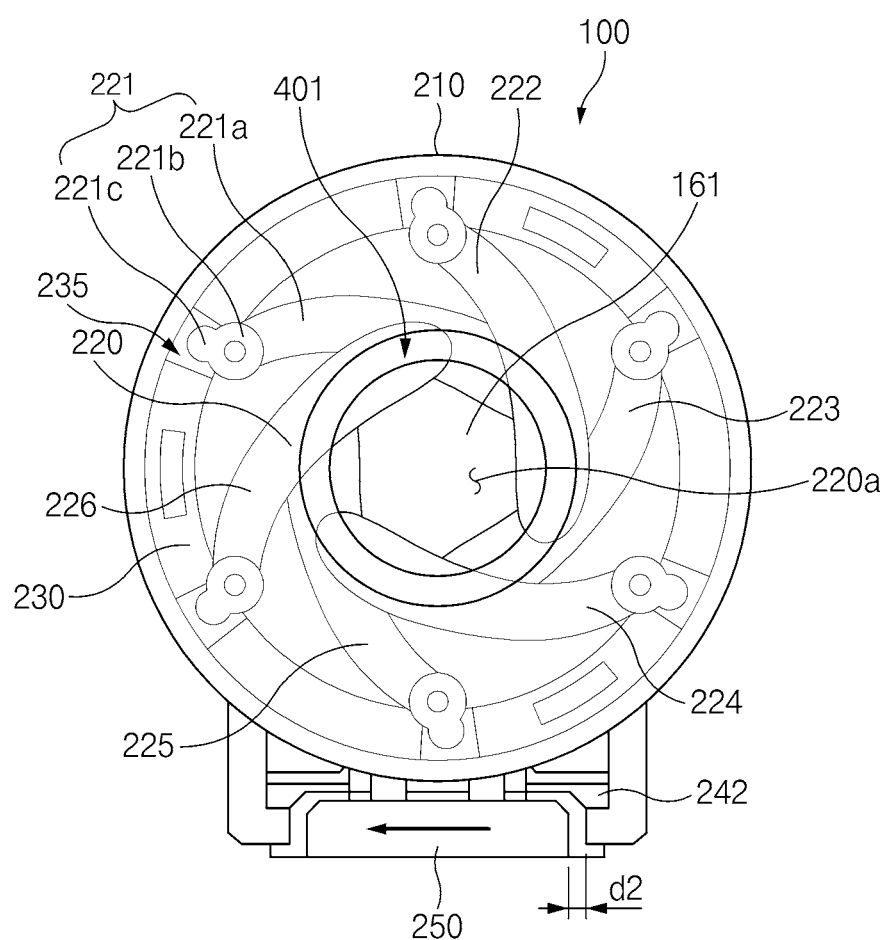
FIG. 4 is a view illustrating a second state of the camera module of the first type according to an embodiment of the disclosure.

FIG. 4 is a view illustrating a second state of the camera module of the first type according to an embodiment of the disclosure.

Referring to FIGS. 1, 2A, and 4, when an electric current having a first amount of electric charge flows through the iris diaphragm coil 250_1 of the camera module 100 of the first type, the iris diaphragm driving member 250 may be moved linearly, gradually, or at constant speed by a first distance in one direction (e.g., to the left with respect to the drawing), with a change in the magnetic force of the iris diaphragm driving member 250. As the iris diaphragm driving member 250 is moved, the iris diaphragm ring 230 to which a kinetic force (or a force) is transmitted from the iris diaphragm driving member 250 may rotate, and the iris diaphragm blade part 220 coupled with the iris diaphragm ring 230 may rotate (e.g., the mounting parts 221*c* of the blades mounted in the iris diaphragm recesses 235 may rotate about the connecting parts 221*b*). Accordingly, the bodies 221*a* of the blades 221, 222, 223, 224, 225, and 226 of the iris diaphragm blade part 220 may rotate in a predetermined direction. As the blades 221, 222, 223, 224, 225, and 226 rotate in one direction, the aperture ratio of the aperture 220*a* in the center may be changed. According to an embodiment, the aperture ratio of the aperture 220*a* of the iris diaphragm blade part 220 of the camera module 100 of the first type may have a second size (e.g., a size smaller than the first size), with a movement of the iris diaphragm driving member 250 by a first distance in one direction. In this regard, the camera module 100 of the first type may be in a second state 401 in which the iris diaphragm driving member 250 is located in a second position (e.g., a position where the gap between the iris diaphragm driving member 250 and the holder support part 242 is equal to a second gap of d2). The second gap d2 may be greater than the first gap d1.

Figure 5:
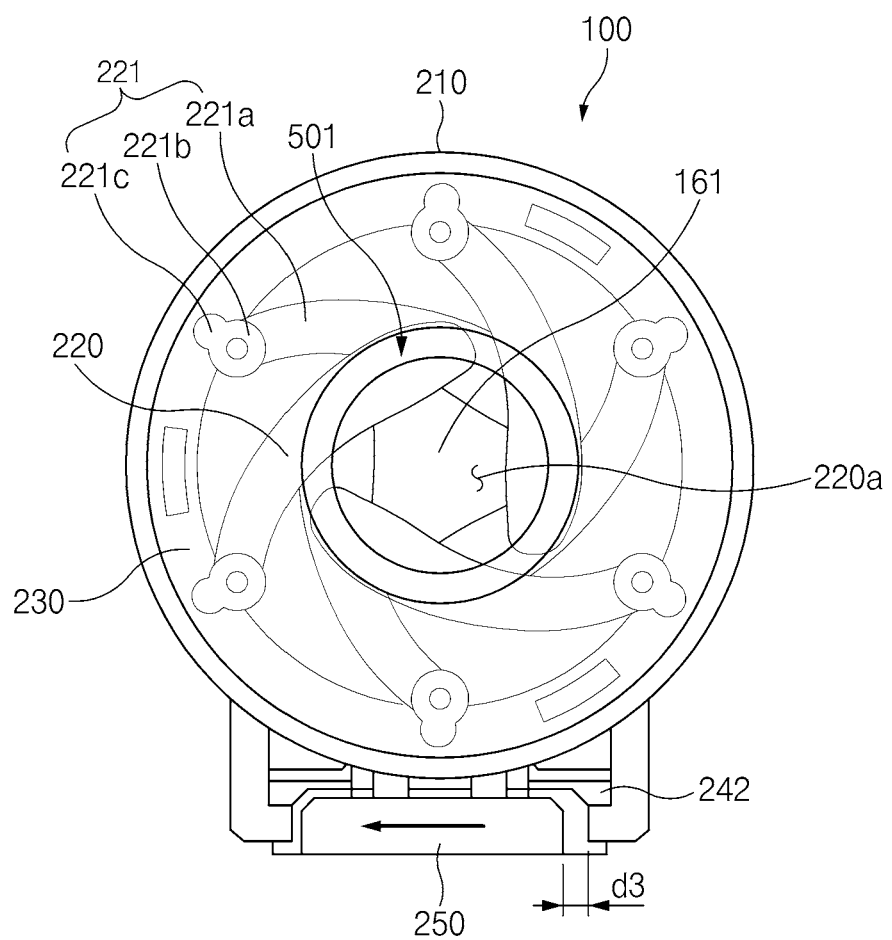
FIG. 5 is a view illustrating a third state of the camera module of the first type according to an embodiment of the disclosure.

FIG. 5 is a view illustrating a third state of the camera module of the first type according to an embodiment of the disclosure.

Referring to FIGS. 1, 2A, and 5, when an electric current having a second amount of electric charge (e.g., an electric current having an amount of electric charge greater than the first amount of electric charge) flows through the iris diaphragm coil 250_1 of the camera module 100 of the first type, the iris diaphragm driving member 250 may be moved linearly, gradually, or at constant speed by a second distance (e.g., a distance greater than the first distance with respect to the first position illustrated in FIG. 3) in one direction (e.g., to the left with respect to the drawing). As the iris diaphragm driving member 250 is moved, the amount of rotation of the iris diaphragm ring 230 to which a kinetic force is transmitted from the iris diaphragm driving member 250 may become larger than before, and the iris diaphragm blade part 220 coupled with the iris diaphragm ring 230 may rotate more than before (e.g., the mounting parts 221c of the blades 221, 222, 223, 224, 225, and 226 mounted in the iris diaphragm recesses 235 may rotate about the connecting parts 221b through a larger angle than that in the second state 401). As the blades 221, 222, 223, 224, 225, and 226 rotate in one direction through a larger angle than that in the previous state, the aperture ratio of the aperture 220a in the center may be changed. According to an embodiment, the aperture ratio of the aperture 220a of the iris diaphragm blade part 220 may have a third size (e.g., a size smaller than the second size), with a movement of the iris diaphragm driving member 250 by a second distance in one direction. In this regard, the camera module 100 of the first type may be in a third state 501 in which the iris diaphragm driving member 250 is located in a third position (e.g., a position where the gap between the iris diaphragm driving member 250 and the holder support part 242 is equal to a third gap of d3). The third gap d3 may be greater than the second gap d2.

Although it has been described that the camera module 100 of the first type is in the first state 301, the second state 401, or the third state 501, the disclosure is not limited thereto. For example, the camera module 100 of the first type may be gradually changed from the first state 301 to the second state 401 or from the second state 401 to the third state 501, depending on the amount of electric current supplied to the iris diaphragm coil 250_1 in the first state 301. Accordingly, the camera module 100 of the first type may have three or more aperture change states (e.g., four or more aperture change states), depending on a variation in the amount of electric current supplied to the iris diaphragm coil 250_1.

According to various embodiments, the camera module 100 of the first type may be in the third state 501 when an electric current is minimally supplied to the iris diaphragm coil 250_1, and the camera module 100 may be in the first state 301 when an electric current is maximally supplied to the iris diaphragm coil 250_1. Alternatively, the camera module 100 of the first type may be in the third state 501 when an electric current is maximally supplied to the iris diaphragm coil 250_1, and the camera module 100 may be in the first state 301 when an electric current is minimally supplied to the iris diaphragm coil 250_1.

According to various embodiments, the iris diaphragm driving member 250 may return to the initial position (e.g., the first position) when the supply of electric current to the iris diaphragm coil 250_1 is stopped.

Figure 6:
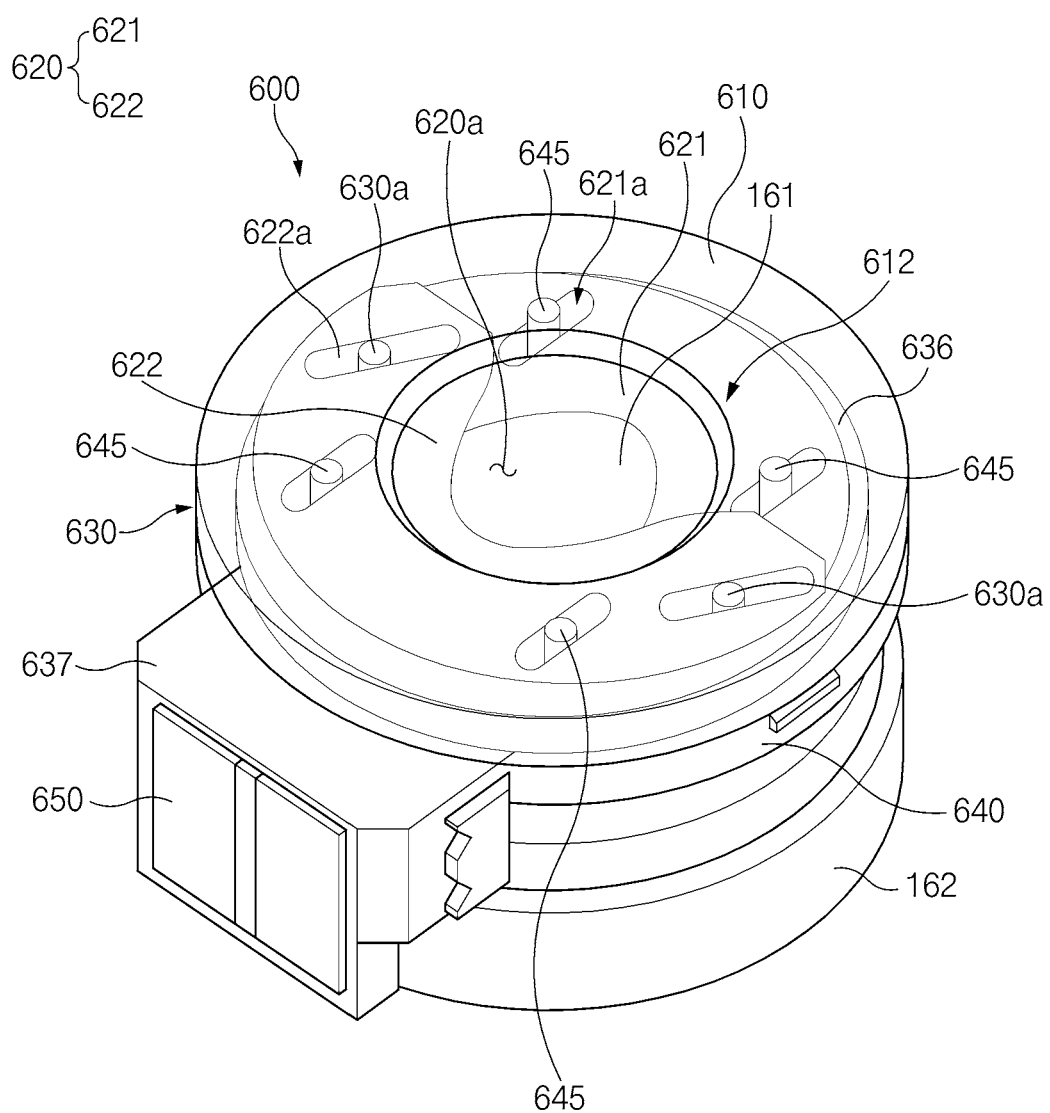
FIG. 6 is a view illustrating an example of some components of a camera module of a second type according to an embodiment of the disclosure.

FIG. 6 is a view illustrating an example of some components of a camera module of a second type according to an embodiment of the disclosure.

Referring to FIGS. 1 and 6, some components of the camera module 600 of the second type may include at least a part (e.g., the lens barrel 162) of a lens assembly, and an iris diaphragm holder 640, an iris diaphragm ring 630, an iris diaphragm blade part 620, an iris diaphragm cover 610, and an iris diaphragm magnet member 650 that are placed over the lens barrel 162.

The iris diaphragm cover 610 may have substantially the same configuration as, or a configuration similar to, that of the iris diaphragm cover 210 described above with reference to FIGS. 1 and 2A. For example, the iris diaphragm cover 610 may have a hole 612 in the center thereof.

The iris diaphragm blade part 620 may be disposed inward of the iris diaphragm cover 610. The iris diaphragm blade part 620 may include, for example, two blades 621 and 622 positioned up and down. The first blade 621 may be disposed on a first horizontal plane parallel to an upper surface of the iris diaphragm cover 610 with respect to the drawing, and the second blade 622 may be horizontally disposed below the first blade 621. The second blade 622 may alternate with the first blade 621 in an up-down direction. The blades 621 and 622 may have a crescent shape or a half-moon (or semicircular) shape with an empty space in the middle. The blades 621 and 622 may be disposed to face each other to form an aperture 620a in the center. The blades 621 and 622 may include a plurality of holes. For example, the blades 621 and 622 may include protrusion fastening holes 622a fastened with protrusions 630a formed on the iris diaphragm ring 630 and guide holes 621a fastened with fixing protrusions 645 formed on the iris diaphragm holder 640. When the iris diaphragm ring 630 moves, the protrusions 630a included in the iris diaphragm ring 630 may move the blades 621 and 622 while moving in one direction. At this time, the blades 621 and 622 may be moved toward each other along the guide holes 621a fastened with the fixing protrusions 645.

The iris diaphragm ring 630 may include the protrusions 630a on which the iris diaphragm blade part 620 is mounted, a ring 636 on which the protrusions 630a are formed, and a slider 637 in which the iris diaphragm magnet member 650 is fixedly mounted. When an electric current flows through the iris diaphragm coil 250_1 disposed on the assembly housing 140, the slider 637 in which the iris diaphragm magnet member 650 is mounted may be moved in one direction (e.g., to the left with respect to the drawing).

The iris diaphragm ring 630 may be mounted on one side of the iris diaphragm holder 640. The iris diaphragm holder 640 may include the fixing protrusions 645 that fix and guide the iris diaphragm blade part 620 in one direction. According to various embodiments, the holder yokes described above with reference to FIGS. 1 and 2A may be disposed on one side of the iris diaphragm holder 640, and a guide ball that supports a movement of the slider 637 and a guide hole in which the guide ball is mounted may be additionally provided on the one side of the iris diaphragm holder 640.

The iris diaphragm magnet member 650 may be fixedly mounted in the slider 637 provided on the iris diaphragm ring 630. When an electric current is supplied to the iris diaphragm coil 250_1 provided on the assembly housing 140, the moving distance or the moving direction of the iris diaphragm magnet member 650 may be changed correspondingly, and the iris diaphragm magnet member 650 may rotate the iris diaphragm ring 630 in one direction to correspond to the yokes disposed on the one side of the iris diaphragm holder 640.

Although it has been exemplified that the iris diaphragm holder 640 is disposed on one side of the lens barrel 162, the disclosure is not limited thereto. For example, as described above, the iris diaphragm ring 630 and the iris diaphragm holder 640 may be disposed on the first carrier 170 described above with reference to FIG. 1. According to various embodiments, the camera module 600 may not include the separate iris diaphragm holder 640, but may include only the lens barrel 162. In this case, components included in the iris diaphragm holder 640, for example, the fixing protrusions 645 and an iris diaphragm driving rail may be formed on one side of the lens barrel 162.

Figure 7:
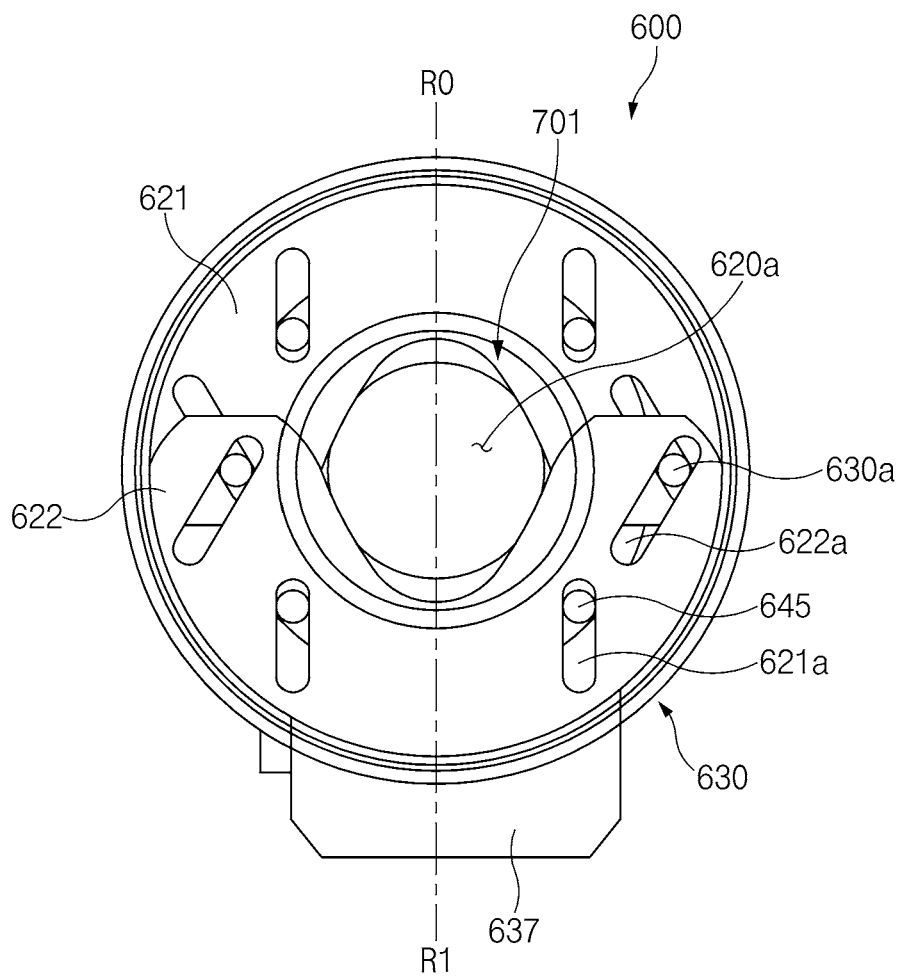
FIG. 7 is a view illustrating a first state of the camera module of the second type according to an embodiment of the disclosure.

FIG. 7 is a view illustrating a first state of the camera module 600 of the second type according to an embodiment of the disclosure.

Referring to FIG. 7, when no electric current is supplied to the iris diaphragm coil 250_1, or an electric current of specified minimum magnitude is supplied thereto, one point (e.g., a center line R1) of the slider 637 of the iris diaphragm ring 630 of the camera module 600 of the second type may be located in a first position (e.g., a position where the center line R1 is located to the right of the center line R0 of the aperture 620a by a predetermined distance). In this case, the centers of the blades 621 and 622 may be spaced apart from each other to the maximum. Accordingly, the camera module 600 of the second type may be in a first state 701 in which the aperture 620a between the blades 621 and 622, the central portions of which are cut away, has a maximum aperture ratio. According to an embodiment, when the aperture 620a of the camera module 600 of the second type is in the first state 701, the degree to which the blades 621 and 622 overlap each other may be lowest. When the camera module 600 of the second type is in the first state 701, each of the protrusions 630a may be biased to one end of the corresponding protrusion fastening holes 622a, and each of the fixing protrusions 645 may be biased to one end of the corresponding guide hole 621a.

Figure 8:
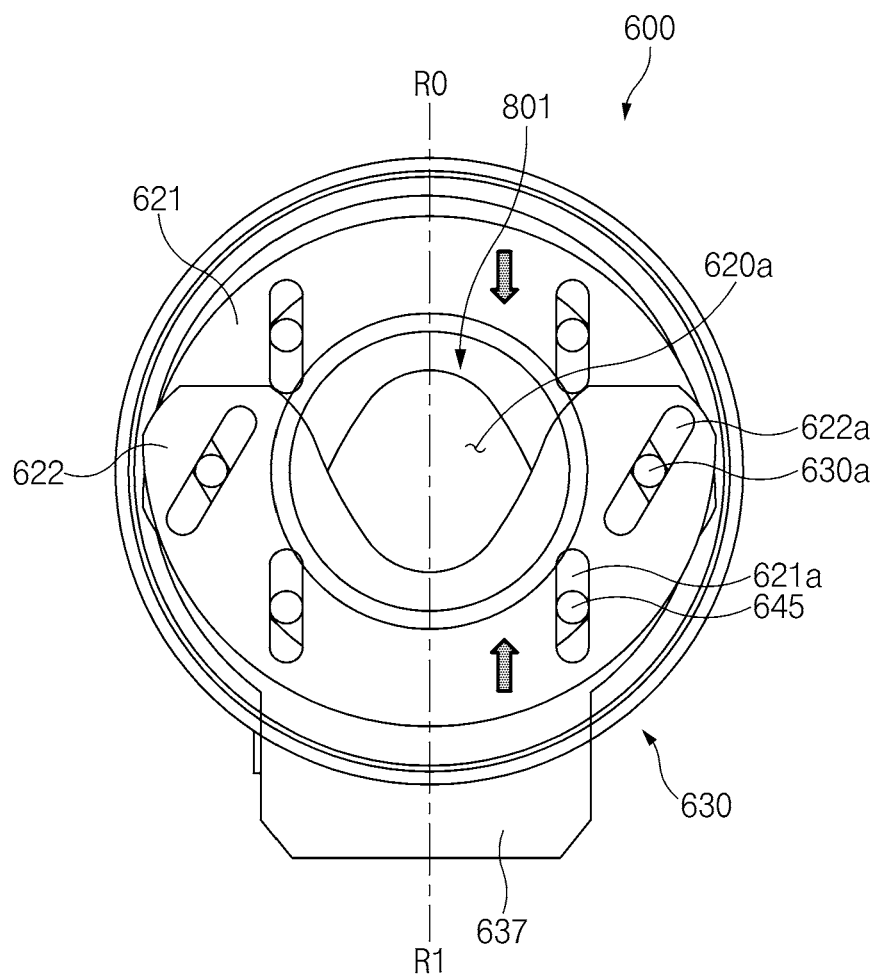
FIG. 8 is a view illustrating a second state of the camera module of the second type according to an embodiment of the disclosure.

FIG. 8 is a view illustrating a second state of the camera module of the second type according to an embodiment of the disclosure.

Referring to FIG. 8, when an electric current of first magnitude is supplied to the iris diaphragm coil 250_1, the camera module 600 of the second type may be in a second state 801 in which the slider 637 of the iris diaphragm ring 630 is moved by a first distance in one direction (e.g., to the left with respect to the drawing). Accordingly, one point (e.g., the center line R1) of the slider 637 may be located in a second position (e.g., a position where the center line R1 coincides with the center line R0 of the aperture 620a). The distance between the centers of the blades 621 and 622 may be smaller than the maximum distance between the centers of the blades 621 and 622.

In the second state 801, the aperture 620a between the blades 621 and 622 may have a smaller aperture ratio than in the first state 701 in which the aperture 620a has the maximum aperture ratio. When the aperture 620a of the camera module 600 of the second type is in the second state 801, the degree to which the blades 621 and 622 overlap each other may be higher than that when the aperture 620a is in the first state 701. When the camera module 600 of the second type is in the second state 801, each of the protrusions 630a may be located in the center of the corresponding protrusion fastening hole 622a, and each of the fixing protrusions 645 may be located in the center of the corresponding guide hole 621a.

Figure 9:
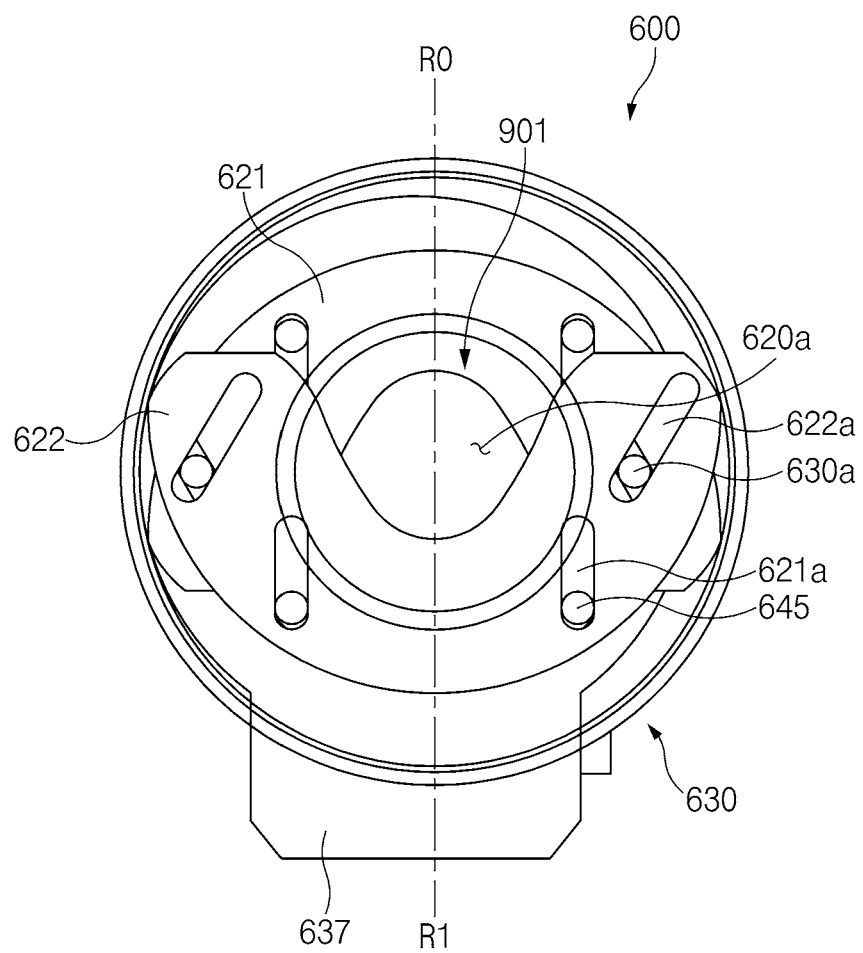
FIG. 9 is a view illustrating a third state of the camera module of the second type according to an embodiment of the disclosure.

FIG. 9 is a view illustrating a third state of the camera module of the second type according to an embodiment of the disclosure.

Referring to FIG. 9, when an electric current of second magnitude greater than the first magnitude is supplied to the iris diaphragm coil 250_1, the camera module 600 of the second type may be in a third state 901 in which the slider 637 of the iris diaphragm ring 630 is moved by a second distance (e.g., a distance greater than the first distance with respect to a right edge of the camera module 600) in one direction (e.g., to the left with respect to the drawing). Accordingly, one point (e.g., the center line R1) of the slider 637 may be located in a third position (e.g., a position where the center line R1 is located to the left of the center line R0 of the aperture 620a by a predetermined distance). In the third state 901, the distance between the centers of the blades 621 and 622 may be smaller than the distance between the centers of the blades 621 and 622 in the second state 801.

In the third state 901, the aperture 620a between the blades 621 and 622 may have a smaller aperture ratio than in the second state 801. When the aperture 620a of the camera module 600 of the second type is in the third state 901, the degree to which the blades 621 and 622 overlap each other may be higher than that when the aperture 620a is in the second state 801. When the camera module 600 of the second type is in the third state 901, each of the protrusions 630a may be biased to an opposite end of the corresponding protrusion fastening holes 622a, and each of the fixing protrusions 645 may be biased to an opposite end of the corresponding guide hole 621a.

As described above, the camera module 600 of the second type may be in a specific state between the first state 701, the second state 801, and the third state 901 while the first blade 621 and the second blade 622, which are connected to the iris diaphragm ring 630, rotate in one direction in accordance with motion (e.g., rotary motion) of the iris diaphragm ring 630. Here, the movement of the blades 621 and 622 of the camera module 600 of the second type may be gradually performed. Accordingly, the aperture ratio variation of the aperture 620a may represent various states by the gradual movement of the blades 621 and 622. For example, the aperture 620a may be in a specific state between the first state 701 and the second state 801 or in a specific state between the second state 801 and the third state 901.

Figure 10:
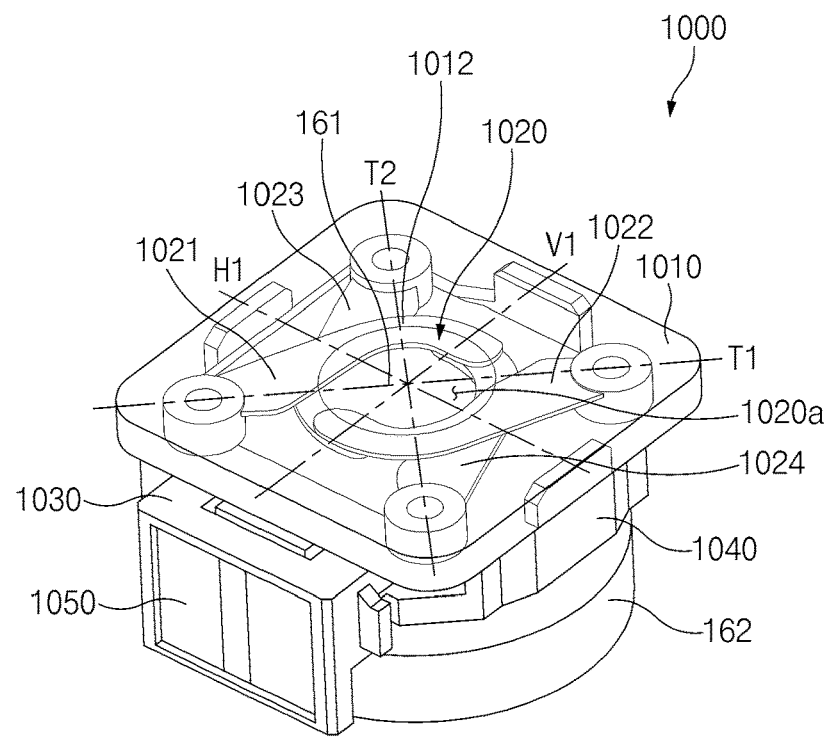
FIG. 10 is a view illustrating an example of some components of a camera module of a third type according to an embodiment of the disclosure.
Figure 10:
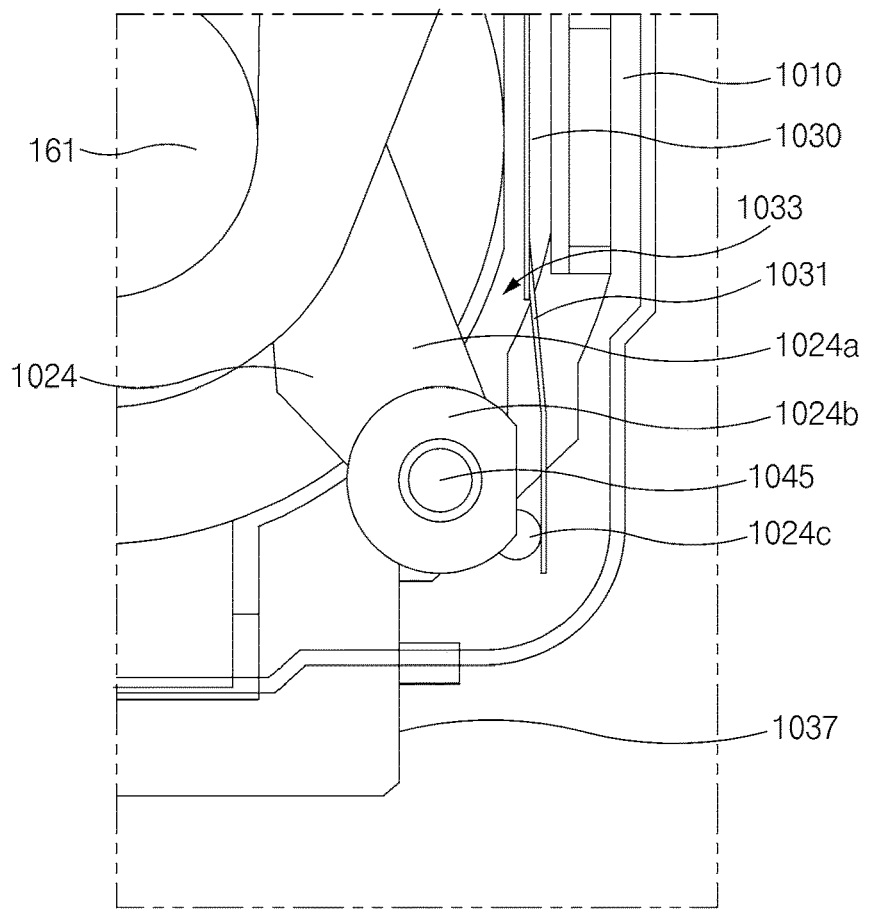

FIG. 10 is a view illustrating an example of some components of a camera module of a third type according to an embodiment of the disclosure.

Referring to FIGS. 1 and 10, some components of the camera module 1000 of the third type may include the lens 161, the lens barrel 162 (or the first carrier 170), and an iris diaphragm holder 1040, an iris diaphragm ring 1030, an iris diaphragm blade part 1020, an iris diaphragm cover 1010, and an iris diaphragm magnet member 1050 that are placed over the lens barrel 162.

The iris diaphragm cover 1010 may have the shape of a cap that includes a hole 1012 in the center and a sidewall at the edge and has a predetermined shape (e.g., a polygonal shape). The iris diaphragm blade part 1020 may be disposed inward of the iris diaphragm cover 1010. The hole 1012 may be aligned with an aperture 1020a formed by the iris diaphragm blade part 1020.

The iris diaphragm blade part 1020 may include, for example, four blades 1021, 1022, 1023, and 1024 arranged in a direction toward a central portion of the iris diaphragm cover 1010 with respect to corners thereof. A first group of blades 1021 and 1022 may be disposed on a first horizontal plane, and a second group of blades 1023 and 1024 may be horizontally disposed below the first group of blades 1021 and 1022. The second group of blades 1023 and 1024 may alternate with the first group of blades 1021 and 1022 in an up-down direction. The blades 1021, 1022, 1023, and 1024 may have the same curved blade shape, but may be disposed in different positions. For example, the fourth blade 1024 may include a fixed part 1024b fixed to the iris diaphragm holder 1040, a body 1024a extending from the fixed part 1024b and arranged in a direction toward the center of the iris diaphragm cover 1010, and a protrusion 1024c protruding a predetermined length from the fixed part 1024b.

The first blade 1021 and the second blade 1022 may be disposed side by side in the direction of a first diagonal line T1 (or symmetric to each other with respect to the first diagonal line T1), and the third blade 1023 and the fourth blade 1024 may be disposed side by side in the direction of a second diagonal line T2 (or symmetric to each other with the second diagonal line T2 perpendicular to the first diagonal line T1). According to various embodiments, the first blade 1021 and the third blade 1023 may be vertically disposed to be symmetric to each other with respect to a virtual horizontal center line H1 illustrated in the drawing. Furthermore, the second blade 1022 and the fourth blade 1024 may be vertically disposed to be symmetric to each other with respect to a virtual vertical center line V1 illustrated in the drawing. The first blade 1021 and the fourth blade 1024 or the second blade 1022 and the third blade 1023 may overlap each other in an up-down direction (e.g., a direction toward the center of a lens barrel from above the lens 161). The size of the overlapping area between the first blade 1021 and the fourth blade 1024 or the size of the overlapping area between the second blade 1022 and the third blade 1023 may vary depending on a variation in the aperture ratio of the aperture 1020a. For example, the size of the overlapping area may increase when the aperture ratio of the aperture 1020a decreases.

Curved parts formed by bending upper ends of the blades 1021, 1022, 1023, and 1024 may be disposed to face each other to form the aperture 1020a in the middle. The aperture 1020a may be aligned with the hole 1012 of the iris diaphragm cover 1010. Sides (e.g., the protrusions 1024c) of the blades 1021, 1022, 1023, and 1024 may be brought into contact with elastic members 1031 (e.g., plate springs) provided on the iris diaphragm ring 1030. The elastic members 1031 may move the protrusions 1024c according to a rotary motion of the iris diaphragm ring 1030, and thus the arrangement of the blades 1021, 1022, 1023, and 1024 may be changed. The size of the aperture 1020a may be increased or decreased with the change in the arrangement of the blades 1021, 1022, 1023, and 1024.

The iris diaphragm ring 1030 may include the elastic members 1031 brought into contact with the protrusions 1024c formed on the respective blades 1021, 1022, 1023, and 1024, a ring member 1033 that rotates while fixing the elastic members 1031, and a slider 1037 that protrudes outward from one side of the ring member 1033 and in which the iris diaphragm magnet member 1050 is mounted.

The slider 1037 may be moved by the iris diaphragm magnet member 1050 when an electric current is supplied to the iris diaphragm coil 250_1 disposed to face the iris diaphragm magnet member 1050. When the slider 1037 is moved, the ring member 1033 connected to the slider 1037 may rotate in one direction, and the elastic members 1031 may correspondingly operate to press the protrusions 1024c in one direction.

The iris diaphragm ring 1030 may be mounted on one side of the iris diaphragm holder 1040. The iris diaphragm holder 1040 may include fixing protrusions 1045 that fix and guide the iris diaphragm blade part 1020 in one direction. The iris diaphragm holder 1040 may include, on one side facing the slider 1037, a guide ball that supports a movement of the slider 1037 and a guide hole in which the guide ball is mounted.

The iris diaphragm magnet member 1050 may be fixedly mounted in the slider 1037 provided on the iris diaphragm ring 1030. When an electric current is supplied to the iris diaphragm coil 250_1 provided on the assembly housing 140, the iris diaphragm magnet member 1050 may move correspondingly and may rotate the iris diaphragm ring 630 in one direction to correspond to a yoke disposed on one side of the iris diaphragm holder 1040.

Figure 11:
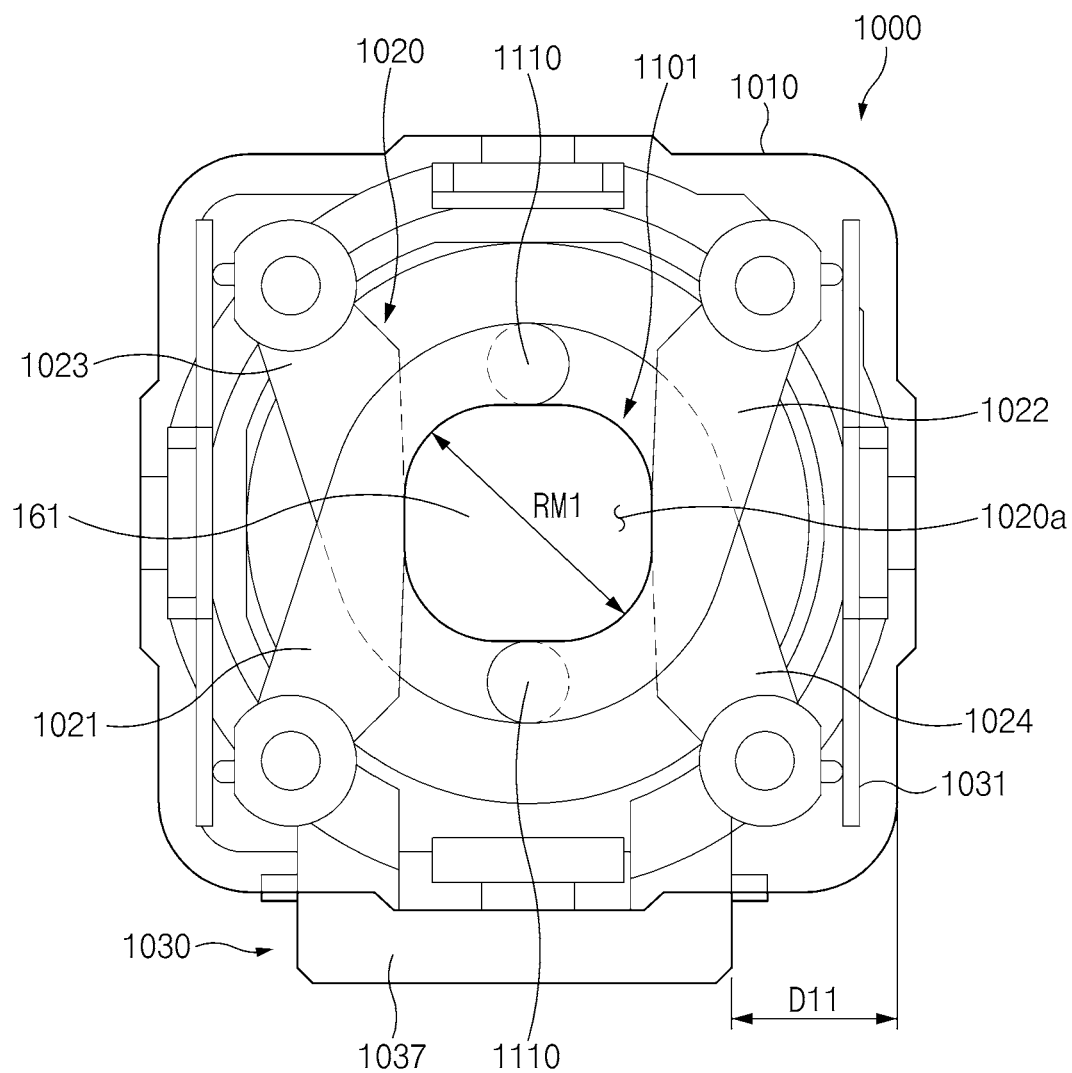
FIG. 11 is a view illustrating a first state of the camera module of the third type according to an embodiment of the disclosure.

FIG. 11 is a view illustrating a first state of the camera module of the third type according to an embodiment of the disclosure.

Referring to FIG. 11, when no electric current is supplied to the iris diaphragm coil 250_1, or an electric current of specified minimum magnitude is supplied thereto, the camera module 1000 of the third type may be in a first state 1101 in which the slider 1037 is located in a first position D11. The first position D11 may include, for example, a position to which the slider 1037 is able to be moved rightward to the maximum with respect to a right side surface of the iris diaphragm holder 1040 (or a right end point of the lens barrel 162 in which the lens 161 is disposed). The elastic members 1031 may be in an initial state of being brought into contact with the blades 1021 and 1022. The first blade 1021 and the second blade 1022 may be spaced apart from each other by a first distance RM1 (e.g., the distance by which the blades 1021, 1022, 1023, and 1024 are able to form the aperture 1020a with a maximum aperture ratio). The third blade 1023 and the fourth blade 1024 may be spaced apart from each other by the first distance RM1. According to various embodiments, when the camera module 1000 of the third type is in the first state 1101, the distance between an end point of the first blade 1021 and an end point of the second blade 1022 may be formed to be largest. Furthermore, when the camera module 1000 of the third type is in the first state 1101, the distance between an end point of the third blade 1023 and an end point of the fourth blade 1024 may be formed to be largest. Moreover, when the camera module 1000 of the third type is in the first state 1101, the distance between the end point of the first blade 1021 and the end point of the third blade 1023 or the distance between the end point of the second blade 1022 and the end point of the fourth blade 1024 may be formed to be largest. In the first state 1101, the size of an overlapping area 1110 between the first blade 1021 and the fourth blade 1024 or the size of an overlapping area 1110 between the second blade 1022 and the third blade 1023 may be a first size.

Figure 12:
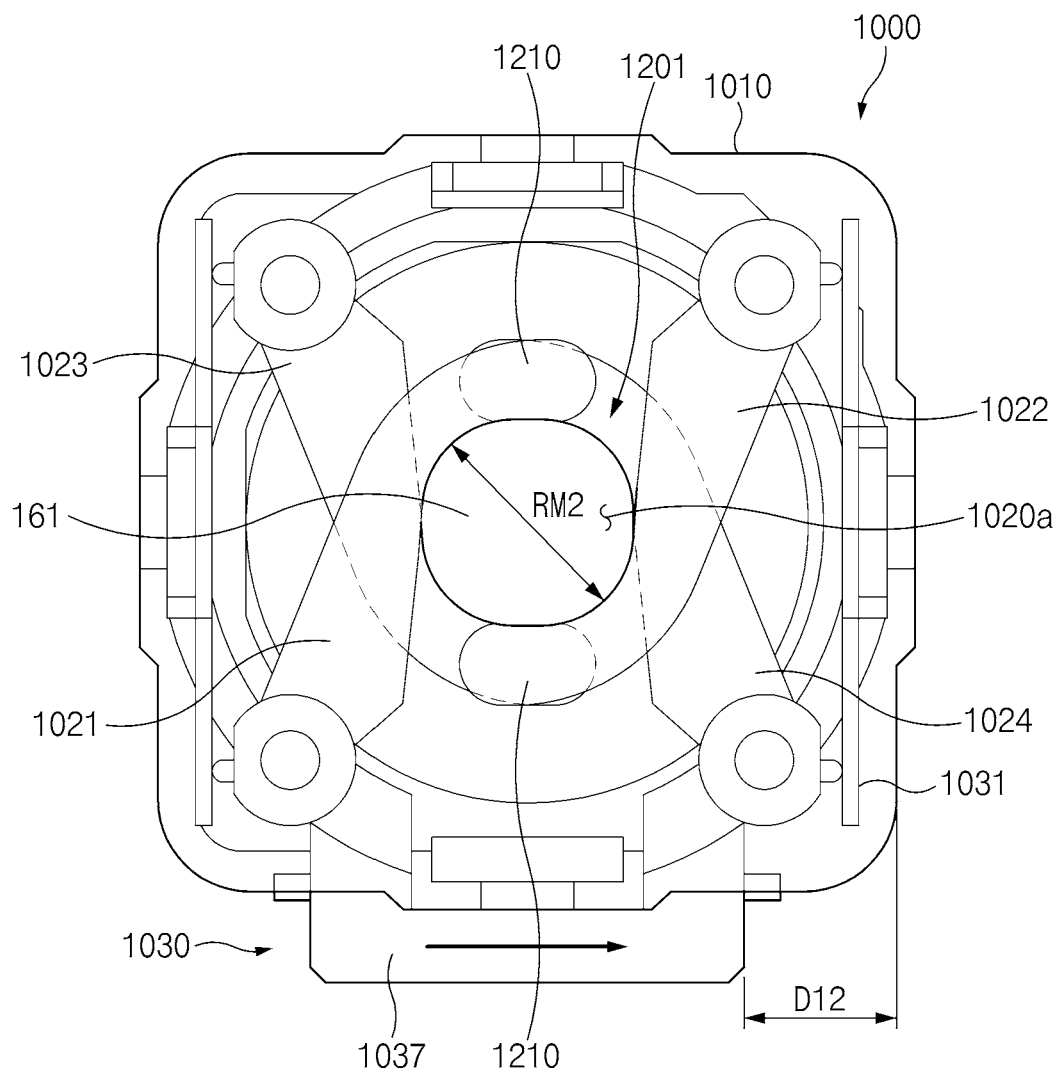
FIG. 12 is a view illustrating a second state of the camera module of the third type according to an embodiment of the disclosure.

FIG. 12 is a view illustrating a second state of the camera module of the third type according to an embodiment of the disclosure.

Referring to FIG. 12, when an electric current of first magnitude (e.g., specified magnitude greater than the minimum magnitude in the first state 1101) is supplied to the iris diaphragm coil 250_1, the camera module 1000 of the third type may be in a second state 1201 in which the slider 1037 is located in a second position D12. The second position D12 may include, for example, a position where the slider 1037 is moved to the left by a predetermined distance with respect to the right side surface of the iris diaphragm holder 1040. The elastic members 1031 disposed on the iris diaphragm ring 1030 may change the positions of the blades 1021 and 1022 according to the movement of the slider 1037.

The first blade 1021 and the second blade 1022 disposed over the lens 161 may be spaced apart from each other by a second distance RM2 (e.g., a distance by which the aperture ratio of the aperture 1020a formed by the blades 1021, 1022, 1023, and 1024 has a specified size), the second distance RM2 being smaller than the first distance RM1. The third blade 1023 and the fourth blade 1024 may also be spaced apart from each other by the second distance RM2.

According to various embodiments, when the camera module 1000 of the third type is in the second state 1201, the distance between the end point of the first blade 1021 and the end point of the second blade 1022 or the distance between the end point of the third blade 1023 and the end point of the fourth blade 1024 may be formed to be smaller than that in the first state 1101. In the second state 1201, the size of an overlapping area 1210 between the first blade 1021 and the fourth blade 1024 or the size of an overlapping area 1210 between the second blade 1022 and the third blade 1023 may be a second size (e.g., an area lager than the first size).

Figure 13:
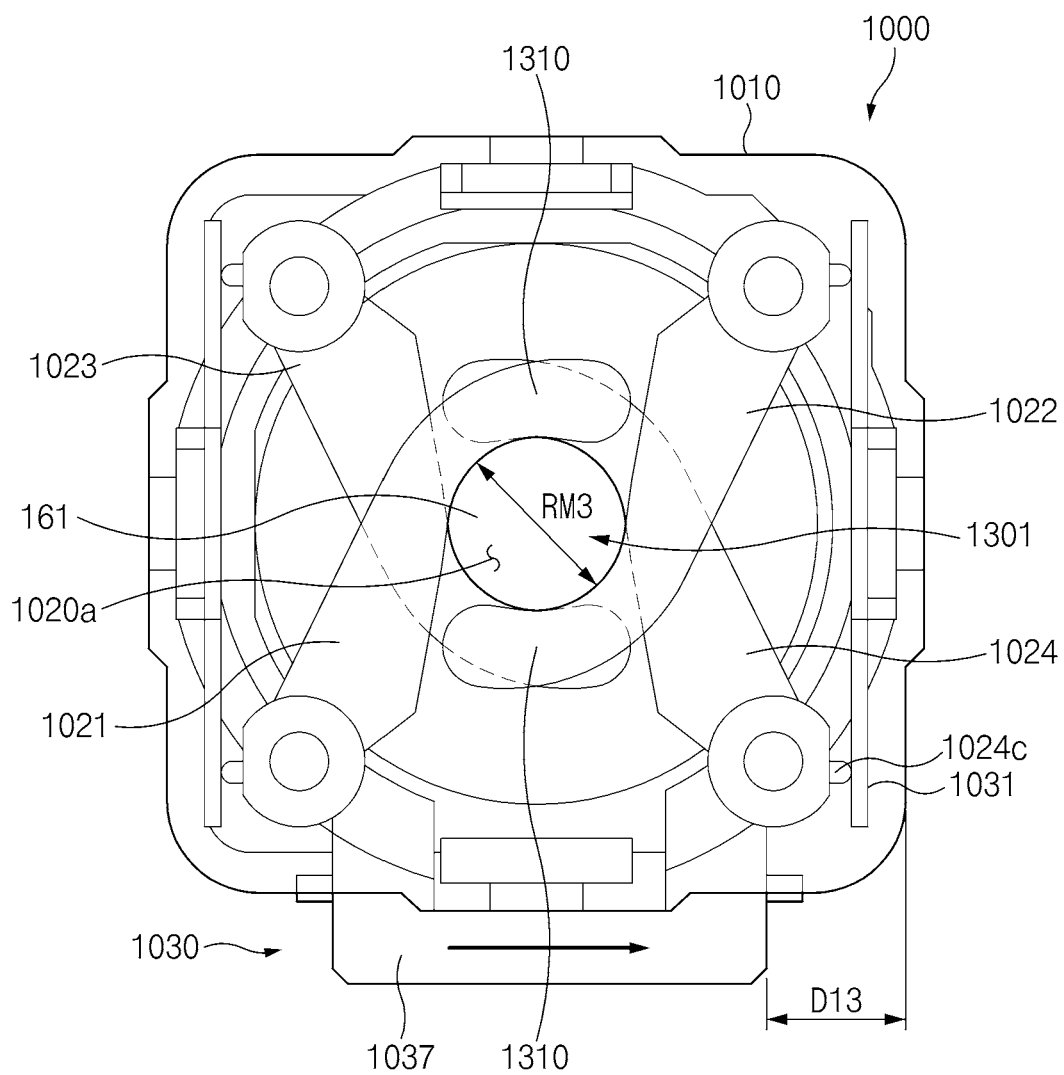
FIG. 13 is a view illustrating a third state of the camera module of the third type according to an embodiment of the disclosure.

FIG. 13 is a view illustrating a third state of the camera module of the third type according to an embodiment of the disclosure.

Referring to FIG. 13, when an electric current of second magnitude (e.g., specified magnitude greater than the first magnitude in the second state 1201) is supplied to the iris diaphragm coil 250_1, the camera module 1000 of the third type may be in a third state 1301 in which the slider 1037 is located in a third position D13. The third position D13 may include, for example, a position where the slider 1037 is moved leftward to the maximum with respect to the right side surface of the iris diaphragm holder 1040. With the maximum movement of the slider 1037, the elastic members 1031 may transmit forces to the blades 1021 and 1022 such that the blades 1021 and 1022 move to the maximum (or the displacements of the blades 1021 and 1022 are greater than those in the second state 1201).

The first blade 1021 and the second blade 1022 disposed over the lens 161 may be spaced apart from each other by a third distance RM3 (e.g., a distance smaller than the second distance RM2). The third blade 1023 and the fourth blade 1024 may also be spaced apart from each other by the third distance RM3. According to various embodiments, when the camera module 1000 of the third type is in the third state 1301, the distance between the end point of the first blade 1021 and the end point of the second blade 1022 or the distance between the end point of the third blade 1023 and the end point of the fourth blade 1024 may be formed to be smaller than that in the second state 1201. In the third state 1301, the size of an overlapping area 1310 between the first blade 1021 and the fourth blade 1024 or the size of an overlapping area 1310 between the second blade 1022 and the third blade 1023 may be a third size (e.g., an area greater than the second size).

As described above, in the case of the camera module 1000 of the third type according to the embodiment, the blades 1021, 1022, 1023, and 1024 move toward the center to change the size of the aperture 1020a when the elastic members 1031 disposed on the iris diaphragm ring 1030 make contact with the protrusions 1024c provided on the respective blades 1021, 1022, 1023, and 1024 and press the protrusions 1024c as the iris diaphragm ring 1030 moves.

Figure 14:
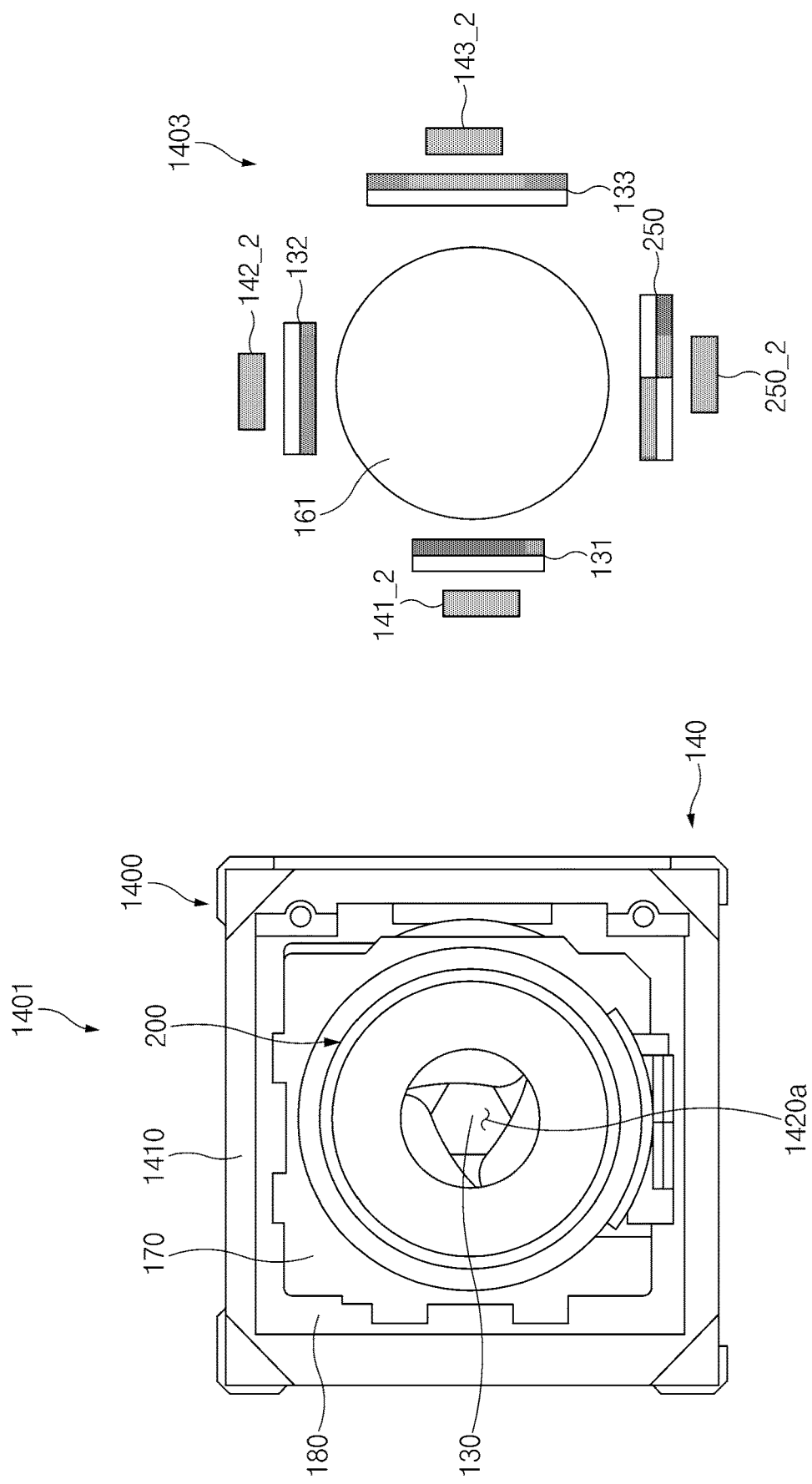
FIG. 14 is a view related to description of a movement of a lens assembly of a camera module including an iris diaphragm module according to an embodiment of the disclosure.

FIG. 14 is a view related to description of a movement of a lens assembly of a camera module including an iris diaphragm module according to an embodiment of the disclosure.

Referring to FIGS. 1 and 14, as in a state 1401, the camera module 1400 according to the embodiment may include a shield can 1410, the assembly housing 140, the lens assembly 130 that is mounted in the assembly housing 140 and that includes the lens 161, and the iris diaphragm module 200 disposed over the lens assembly 130. Additionally, the camera module 1400 may further include the component described above with reference to FIGS. 1 and 2A.

In regard to specified functions, as in a state 1403, the camera module 1400 may include modules disposed on an upper side, a lower side, a left side, and a right side of the lens 161 illustrated (or the lens assembly 130). For example, the camera module 1400 may include a lens driving unit (e.g., the components 131, 132, 141_2, and 142_2 related to OIS as a first lens driving module, the components 133 and 143_2 related to AF as a second lens driving module, and the components 250 and 250_2 related to compensation for driving of the iris diaphragm module 200). For example, the components related to OIS may include the first magnet member 131, the first Hall sensor 141_2, the second magnet member 132, and the second Hall sensor 142_2. As mentioned above, the first magnet member 131 and the second magnet member 132 may be disposed on the first carrier 170. The first Hall sensor 141_2 and the second Hall sensor 142_2 may be disposed on sides of the assembly housing 140. Additionally, the components related to OIS may further include the first coil 141_1 and the second coil 142_1.

The components related to compensation for driving of the iris diaphragm module 200 may include the iris diaphragm driving member 250 (or the iris diaphragm magnet member) and the at least one iris diaphragm Hall sensor 250_2. Additionally, the components related to compensation for driving of the iris diaphragm module 200 may further include the iris diaphragm coil 250_1.

The components 134 and 144_2 related to AF may include the third magnet member 133 and the third Hall sensor 143_2. Additionally, the components related to AF may further include the third coil 143_1.

The first Hall sensor 141_2 may collect X-axis movement sensing information relating to a movement of the lens assembly 130 or the first carrier 170 in the X-axis direction and may provide the X-axis movement sensing information to a processor of the camera module 1400 or a processor of an electronic device. The second Hall sensor 142_2 may collect Y-axis movement sensing information relating to a movement of the lens assembly 130 or the first carrier 170 in the Y-axis direction and may provide the Y-axis movement sensing information to the processor of the camera module 1400 or the processor of the electronic device. The third Hall sensor 143_2 may collect Z-axis movement sensing information relating to a movement of the second carrier 180 in the Z-axis direction and may provide the Z-axis movement sensing information to the processor of the camera module 1400 or the processor of the electronic device.

According to various embodiments, when the iris diaphragm Hall sensor 250_2 includes a plurality of iris diaphragm Hall sensors, control circuitry of the camera module 1400 (e.g., the control circuitry 101 of FIG. 1) may more accurately determine the current position of the iris diaphragm magnet member 250, based on sensing information obtained from the plurality of iris diaphragm Hall sensors

250_2. In this case, the control circuitry may determine the current position of the iris diaphragm magnet member 250, based on the sensing information obtained from the plurality of iris diaphragm Hall sensors 250_2 and may determine the amount of electric current that is to be supplied to the iris diaphragm coil 250_1 to cause the iris diaphragm magnet member 250 to move to a position where the iris diaphragm magnet member 250 has to be located for a set aperture value.

Figure 15:
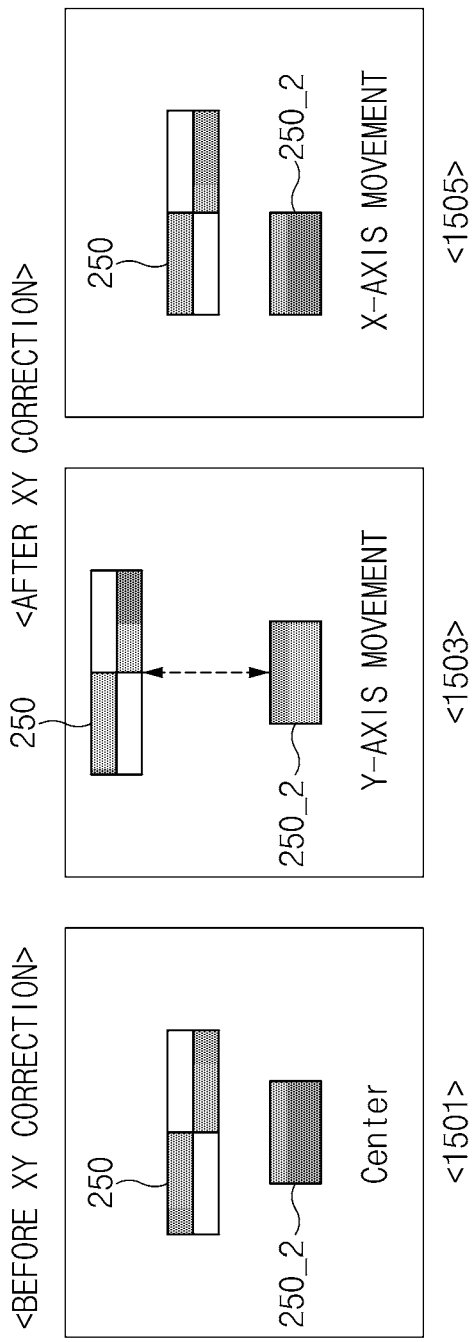
FIG. 15 is a view related to an error of an iris diaphragm module in accordance with a movement of the lens assembly according to an embodiment of the disclosure.

FIG. 15 is a view related to an error of an iris diaphragm module in accordance with a movement of the lens assembly according to an embodiment of the disclosure.

Referring to FIGS. 1, 14, and 15, when the lens assembly 130 or the first carrier 170 is not shaken (the following description being focused on the first carrier 170), as in a state 1501, the distance between the iris diaphragm Hall sensor 250_2 and the iris diaphragm driving member (or the iris diaphragm magnet member) 250 may be adjusted to correspond to set positions. Alternatively, according to various embodiments, when the aperture ratio of an aperture 1420a is set to maintain a specific aperture ratio (or a specified aperture ratio) according to a user input or set information, the positions of the iris diaphragm driving member 250 and the iris diaphragm Hall sensor 250_2 may be adjusted according to the corresponding settings. For example, when the aperture ratio of the aperture 1420a is set to a maximum size as described above with reference to FIG. 3, the position of the iris diaphragm driving member 250 may be adjusted correspondingly.

When the first carrier 170 is shaken, the OIS module may move the first carrier 170 in the Y-axis direction or the X-axis direction to compensate for the shake. When the first carrier 170 is moved in the Y-axis direction, the distance between the iris diaphragm Hall sensor 250_2 and the iris diaphragm driving member 250 may be changed as in a state 1503, irrespective of aperture ratio settings of the iris diaphragm. Alternatively, when the first carrier 170 is moved in the X-axis direction, the positions of the iris diaphragm Hall sensor 250_2 and the iris diaphragm driving member 250 may be changed as in a state 1505, irrespective of aperture ratio settings of the iris diaphragm.

According to various embodiments, when the second carrier 180 in which the lens assembly 130 is mounted is vertically moved according to AF control, the arrangement of the iris diaphragm driving member 250 and the iris diaphragm Hall sensor 250_2 may be changed.

Figure 16:
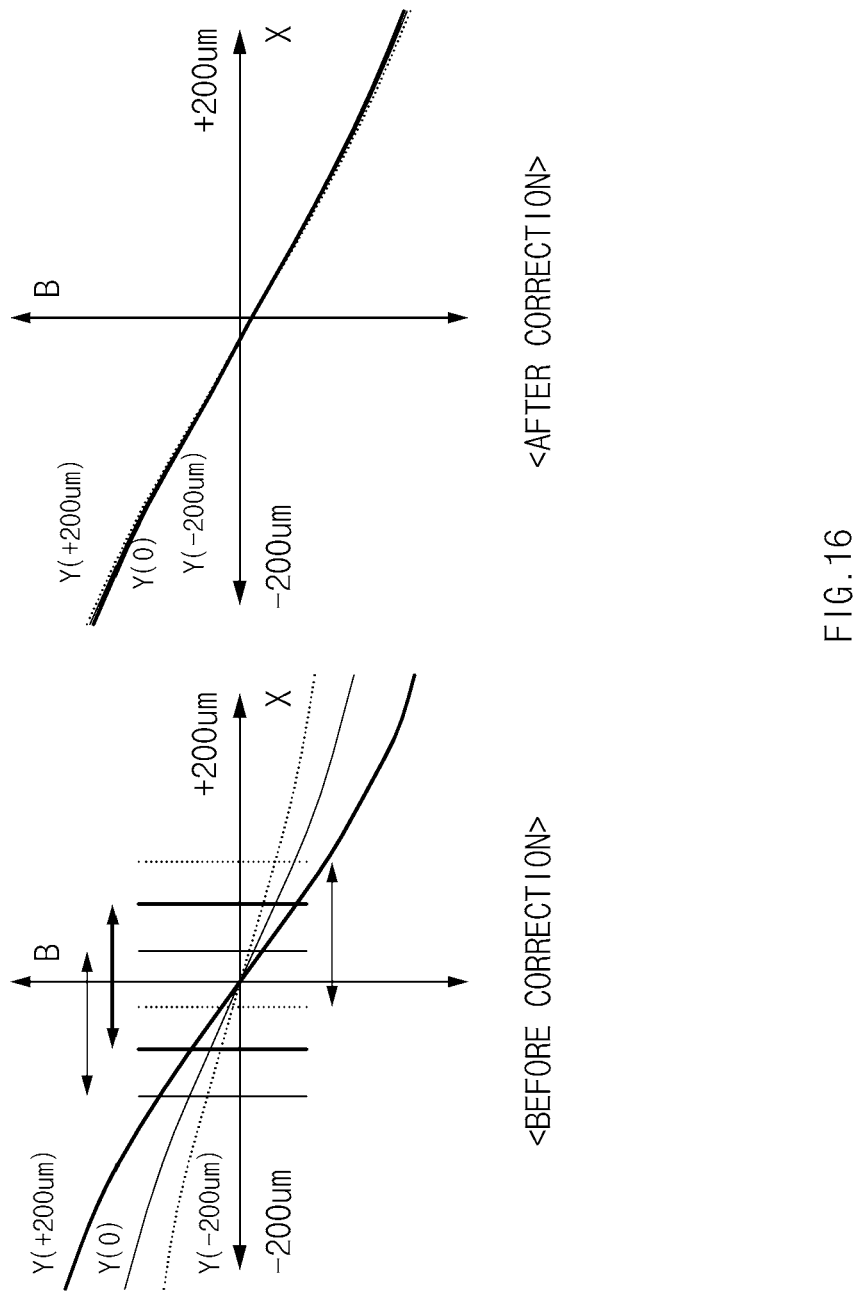
FIG. 16 illustrates graphs depicting compensation for a movement of an iris diaphragm module according to an embodiment of the disclosure.

FIG. 16 illustrates graphs depicting compensation for a movement of an iris diaphragm module according to an embodiment of the disclosure.

Referring to FIGS. 1, 14, and 16, the position of the iris diaphragm driving member 250 fixed to the first carrier 170 may be corrected to cause the lens 161 to perform an OIS operation in the XY plane. For example, a processor (e.g., at least one of the processor of the camera module or the processor of the electronic device) may obtain a variation in at least one of the first Hall sensor 141_2 and the second Hall sensor 142_2 and may apply a compensation value for compensating for the corresponding variation to the iris diaphragm Hall sensor 250_2 to cause the iris diaphragm driving member 250 to be located in a position to maintain a specified aperture ratio. For example, when OIS is not performed or there is no camera-shake (the camera is held), an aperture ratio variation of the iris diaphragm driving member 250 may have a first graph (Y(0)) state. When OIS occurs, the aperture ratio variation curve of the iris diaphragm driving member 250 may be changed according to a second graph (Y(+200 μm) or third graph (Y(−200 μm)) state as before the correction. Alternatively, the center of the graph may be moved to the left or right by a predetermined distance in the X-axis direction without being located at a zero point.

The processor may compensate for a variation in movement of the iris diaphragm driving member 250 according to OIS along the X-axis or the Y-axis and may perform control such that the size of the aperture is changed according to a specified aperture ratio variation curve.

In the case of a change of the Z-axis, a variation in the magnitude of a Hall sensing amount according to Z-axis movement may be smaller than that in the case of the X-axis or the Y-axis because the magnet member of the iris diaphragm driving member has a predetermined length in the Z-axis direction. Therefore, the processor may selectively omit compensation for movement of the iris diaphragm driving member according to Z-axis movement.

As described above, a camera module according to an embodiment and an electronic device including the same may linearly control the opening degree of an iris diaphragm irrespective of OIS or AF. In this regard, the camera module and the electronic device may identify the amounts of movement in the X and Y directions by using X and Y Hall sensors (or, the first Hall sensor 141_2 and the second Hall sensor 142_2) for X and Y direction movement control for OIS and may correct a signal variation of an iris diaphragm Hall sensor (e.g., the iris diaphragm Hall sensor 250_2) when the X and Y axes move. According to various embodiments, the camera module and the electronic device may linearly control an iris diaphragm driving member irrespective of X and Y axis movement, by storing a variation in the iris diaphragm Hall sensor (e.g., the iris diaphragm Hall sensor 250_2) while making a movement such that the aperture ratio of the aperture 1420a has a maximum value or a minimum value for the X-axis direction and the Y-axis direction, followed by correcting (e.g., correcting using a lookup table) the stored variation data when driving the iris diaphragm.

As described above, the camera module and the electronic device of the disclosure may linearly control the iris diaphragm. Accordingly, the camera module and the electronic device may perform control to have aperture values in several steps, and it is not necessary to stop a screen in the process of switching the iris diaphragm by a linear operation.

Figure 17:
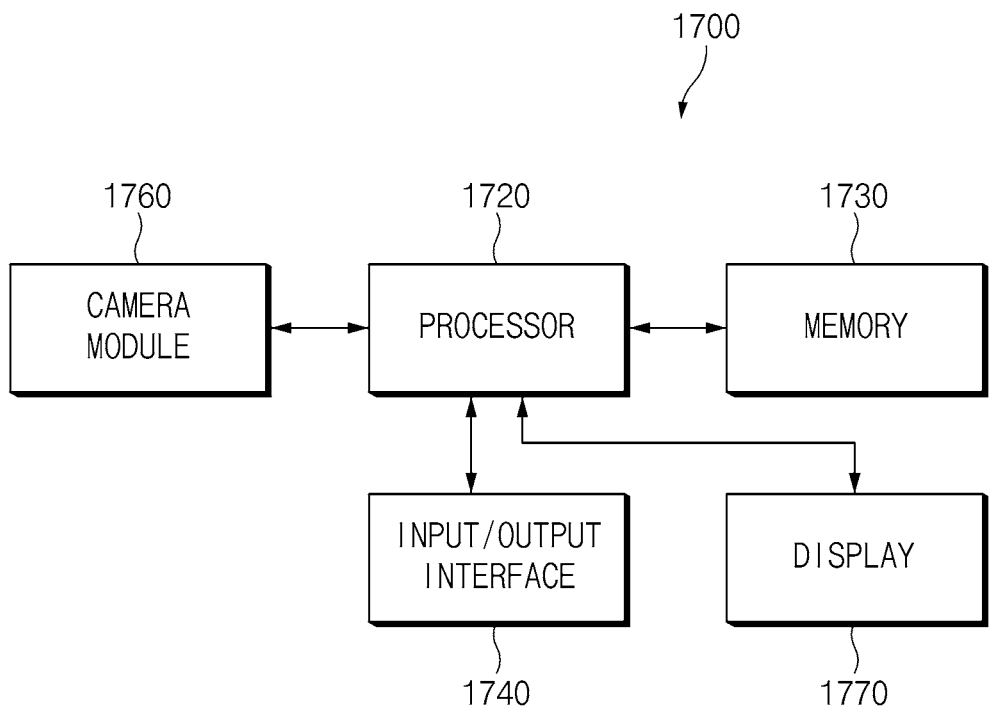
FIG. 17 is a view illustrating an example of a configuration of an electronic device having a camera module applied thereto according to an embodiment of the disclosure.

FIG. 17 is a view illustrating an example of a configuration of an electronic device having a camera module applied thereto according to an embodiment of the disclosure.

Referring to FIG. 17, an electronic device 1700 according to an embodiment of the disclosure may include a processor 1720, a memory 1730, an input/output interface 1740, a camera module 1760 (e.g., the camera module 100), and a display 1770.

The electronic device 1700 may further include a printed circuit board on which the processor 1720, the memory 1730, the camera module 1760, and the like are mounted and a case (or, a frame or a housing) that protects the printed circuit board, the display 1770, and the like. The camera module 1760 may be disposed on one side of the case. According to various embodiments, one surface of the camera module 1760 (e.g., a surface in which a lens hole is formed) may be exposed to the outside through a hole formed on one side of the case. A cover (e.g., a glass cover) related to protection of the camera module 1760 may be disposed in the hole formed on the case.

According to an embodiment of the disclosure, the processor 1720 may transfer a control signal related to driving of the camera module 1760 to the camera module 1760 and may output an image taken with the camera module 1760, through the display 1770 or may store the image in the memory 1730. According to an embodiment, the processor 1720 may output a user interface (UI) related to a selection of a photographing function using the camera module 1760, though the display 1770. For example, the processor 1720 may output an iris diaphragm setting menu screen or icon on the display 1770. The processor 1720 may transfer a first control signal corresponding to a selection of an iris diaphragm setting menu to the camera module 1760.

According to various embodiments, the processor 1720 may identify an iris diaphragm setting value and may transfer a control signal corresponding to the iris diaphragm setting value to the camera module 1760. For example, the electronic device 1700 may provide numbers of 1 to 10 related to the iris diaphragm setting value and may transfer an iris diaphragm setting value corresponding to a number selected by a user, to the camera module 1760. In this regard, the electronic device 1700 may store and manage a first lookup table in which the user selected value provided through the user interface and the iris diaphragm setting value (e.g., a value defining the magnitude of electric current) are mapped. According to various embodiments, the electronic device 1700 may further include an illuminance sensor and may automatically adjust an aperture value according to an illuminance value. In this regard, the electronic device 1700 may provide an icon or menu related to an automatic iris diaphragm adjustment function, and when the automatic iris diaphragm adjustment function is selected, the electronic device 1700 may collect an illuminance value around the electronic device 1700. The processor 1720 may obtain a specified aperture setting value corresponding to the obtained illuminance value, based on a preset database and may transfer the obtained aperture setting value to the camera module 1760.

In regard to iris diaphragm compensation, the processor 1720 may receive sensor information (e.g., X and Y axis sensing information relating to optical image stabilization) from the camera module 1760 and may select an aperture setting value to be corrected, based on the received sensor information. Here, the electronic device 1700 may store and manage a second lookup table in which aperture setting values required to maintain an aperture value specified according to the X and Y axis sensing information are recorded. The processor 1720 may transfer an aperture setting value to the camera module 1760 with reference to the second lookup table such that an iris diaphragm aperture ratio specified according to a change in the X and Y axis sensing information is maintained.

The memory 1730 may store programs or data associated with operating the electronic device 1700. The memory 1730 may store an image (e.g., a preview image, a still image, a moving image, or the like) collected by the camera module 1760. According to an embodiment, the memory 1730 may store an application associated with operating the camera module 1760. Alternatively, the memory 1730 may store aperture setting values (e.g., the first lookup table and the second lookup table) that are to be transferred to the camera module 1760, in response to a user input that is input from the input/output interface 1740.

The input/output interface 1740 may include at least one input device for generating an input signal corresponding to a user input of the electronic device 1700. According to various embodiments, the input/output interface 1740 may generate and transfer a user input for setting a function of the camera module 1760, for example, a user input for application of an automatic iris diaphragm adjustment function or a user input associated with manual iris diaphragm adjustment, to the processor 1720 in response to user control. In the manual iris diaphragm adjustment function, the input/output interface 1740 may generate and transfer a user input for selecting a specific aperture setting value to the processor 1720 in response to user control.

According to an embodiment, the input/output interface 1740 may include an audio device and may output audio information associated with driving an iris diaphragm module of the camera module 1760. For example, when an input signal associated with a request for activation of the camera module 1760 is generated, the audio device may output audio information indicating the current iris diaphragm adjustment state of the camera module 1760 (e.g., the first state 301 of FIG. 3, the second state 302 of FIG. 4, the third state 303 of FIG. 5, or the like). Alternatively, when the adjustment state of the camera module 1760 is changed, the audio device may output audio information corresponding to the changed adjustment state.

The display 1770 may output at least one screen associated with operating the electronic device 1700. According to an embodiment, the display 1770 may provide an icon or menu associated with activation or deactivation of the camera module 1760. The display 1770 may output a user interface for selecting an adjustment state of the camera module 1760 (e.g., the first state 301 of FIG. 3, the second state 302 of FIG. 4, the third state 303 of FIG. 5, or the like). Alternatively, when the camera module 1760 is activated in response to a request for activation of the camera module 1760, the display 1770 may output text or an image that corresponds to the adjustment state of the iris diaphragm module.

According to various embodiments, a camera module may include a lens, a plurality of iris diaphragm blades fixedly disposed over the lens to operate, an iris diaphragm carrier (or an iris diaphragm ring) for linearly moving the plurality of iris diaphragm blades located over the lens, an iris diaphragm driver including an iris diaphragm magnet member (magnet) that is located on a side surface of a lens driving carrier (e.g., an OIS carrier or the first carrier 170) to move the iris diaphragm carrier, a coil (or an iris diaphragm coil) fixed to a side surface of an actuator to move the iris diaphragm driver, and a Hall sensor located inside or outside a coil for detecting the position of the iris diaphragm driver.

The OIS carrier (or the first carrier 170) having magnets (e.g., a first magnet member and a second magnet member) disposed on the side surface thereof may perform an OIS operation by two coils (e.g., a first coil and a second coil) fixed to the side surface of the actuator, and the OIS operation position may be detected by Hall sensors (e.g., a first Hall sensor and a second Hall sensor) disposed at the two coils.

An auto focus (AF) carrier (or the second carrier 180) in which the OIS carrier is received may have a magnet (e.g., a third magnet member) on one side surface thereof and may perform a focusing function in the Z-axis direction by a coil (e.g., a third coil) and a Hall sensor (e.g., a third Hall sensor) that are disposed on one side surface of the actuator.

In the above configuration, all the coils and the Hall sensors are fixed to the actuator and do not move, and in OIS and AF operations, the iris diaphragm driving member moves depending on the OIS position. The Hall sensors are fixed to the outside, and the magnets informing of driving of the iris diaphragm and the position thereof may be moved along the X, Y, and Z axes. Therefore, the control circuitry may process an operation of correcting the movement. Due to the magnetization direction of the iris diaphragm magnet, a change of the Hall sensors is very small for Z-axis movement, but very large for X-axis movement and Y-axis movement. Therefore, the control circuitry may correct a signal change by an OIS operation and may correct all of the X-axis movement, the Y-axis movement, and the Z-axis movement as needed.

According to various embodiments, a camera module may include a housing, a lens assembly that is received in the housing and that includes at least one lens, an iris diaphragm that is disposed over the lens assembly and that adjusts an amount of external light incident on the at least one lens, an iris diaphragm magnet member that is disposed on one surface of the lens assembly and that adjusts the iris diaphragm, a coil disposed on one surface of the housing to face the iris diaphragm magnet member, at least one sensor that is disposed on the one surface of the housing and that senses a magnetic force of the iris diaphragm magnet member, a lens driving unit that moves the lens assembly, and control circuitry. The control circuitry may be configured to obtain sensing information according to the movement of the lens assembly and calculate a signal to be supplied to the coil, based on the sensing information.

According to various embodiments, the lens driving unit may include a first magnet member and a first Hall sensor that are related to a movement in a first axial direction with regard to OIS and a second magnet member and a second Hall sensor that are related to a movement in a second axial direction with regard to the optical image stabilization, and the first axial direction and the second axial direction may be perpendicular to a third axial direction that the lens faces. The control circuitry may be configured to obtain sensing information from the first Hall sensor that senses the first magnet member disposed on the same axis as the iris diaphragm magnet member.

According to various embodiments, the control circuitry may be configured to apply the sensing information to correct a position of the iris diaphragm magnet member.

According to various embodiments, the control circuitry may be configured to calculate a signal value to be applied to the coil to correspond to the sensing information, based on a lookup table stored in a memory.

According to various embodiments, the lens driving unit may include a first magnet member and a first Hall sensor that are related to a movement in a first axial direction with regard to OIS and a second magnet member and a second Hall sensor that are related to a movement in a second axial direction with regard to the optical image stabilization, and the control circuitry may be configured to obtain sensing information from the first Hall sensor and the second Hall sensor.

According to various embodiments, the control circuitry may be configured to apply the sensing information to correct a position of the iris diaphragm magnet member.

According to various embodiments, the control circuitry may be configured to calculate a signal value to be applied to the coil to correspond to the sensing information, based on a lookup table stored in a memory.

According to various embodiments, the lens driving unit may include a first magnet member and a first Hall sensor that are related to a movement in a first axial direction with regard to optical image stabilization, a second magnet member and a second Hall sensor that are related to a movement in a second axial direction with regard to the optical image stabilization, and a third magnet member and a third Hall sensor that are related to a movement in a third axial direction with regard to AF, and the control circuitry may be configured to obtain sensing information from the first Hall sensor, the second Hall sensor, and the third Hall sensor and apply the obtained sensing information to correct a position of the iris diaphragm magnet member.

According to various embodiments, the iris diaphragm may include an iris diaphragm blade part including a plurality of blades, an iris diaphragm ring on which the iris diaphragm blade part is mounted, and an iris diaphragm holder on which the iris diaphragm ring is mounted, wherein the iris diaphragm holder is moved within a predetermined range by the iris diaphragm magnet member.

According to various embodiments, the iris diaphragm blade part may include three or more blades disposed to adjust a size of an aperture in the center while rotating through a predetermined angle or two blades disposed to adjust a size of an aperture in the center while moving toward or away from each other.

According to various embodiments, an electronic device may include a camera module, a memory, and a processor operatively connected with the camera module and the memory, and the camera module may include a housing, a lens assembly that is received in the housing and that includes at least one lens, an iris diaphragm that is disposed over the lens assembly and that adjusts an amount of external light incident on the at least one lens, an iris diaphragm magnet member that is disposed on one surface of the lens assembly and that adjusts the iris diaphragm, a coil disposed on one surface of the housing to face the iris diaphragm magnet member, at least one sensor that is disposed on the one surface of the housing and that senses a magnetic force of the iris diaphragm magnet member, a lens driving unit that moves the lens assembly, and control circuitry. The control circuitry may be configured to gradually change a magnitude of a signal supplied to the coil to gradually change an aperture ratio of an aperture of the iris diaphragm.

According to various embodiments, a method of adjusting an aperture ratio of a camera module of an electronic device may include detecting a magnetic force between a lens assembly of the camera module and a surface of a housing of the camera module, determining a position of the lens assembly relative to the surface of the housing, based on the magnetic force, correcting a signal for controlling an amount of electric current supplied to a coil according to the position of the lens assembly, and adjusting the aperture ratio of an iris diaphragm of the camera module by using an electromagnetic force output through the coil according to the corrected signal.

According to various embodiments, the adjusting of the aperture ratio of the iris diaphragm may include one of rotating a plurality of blades within a predetermined angular range, or moving the plurality of blades toward or away from each other within a predetermined linear range.

According to various embodiments, the adjusting of the aperture ratio of the iris diaphragm may include moving an iris diaphragm holder within a predetermined range.

Figure 18A:
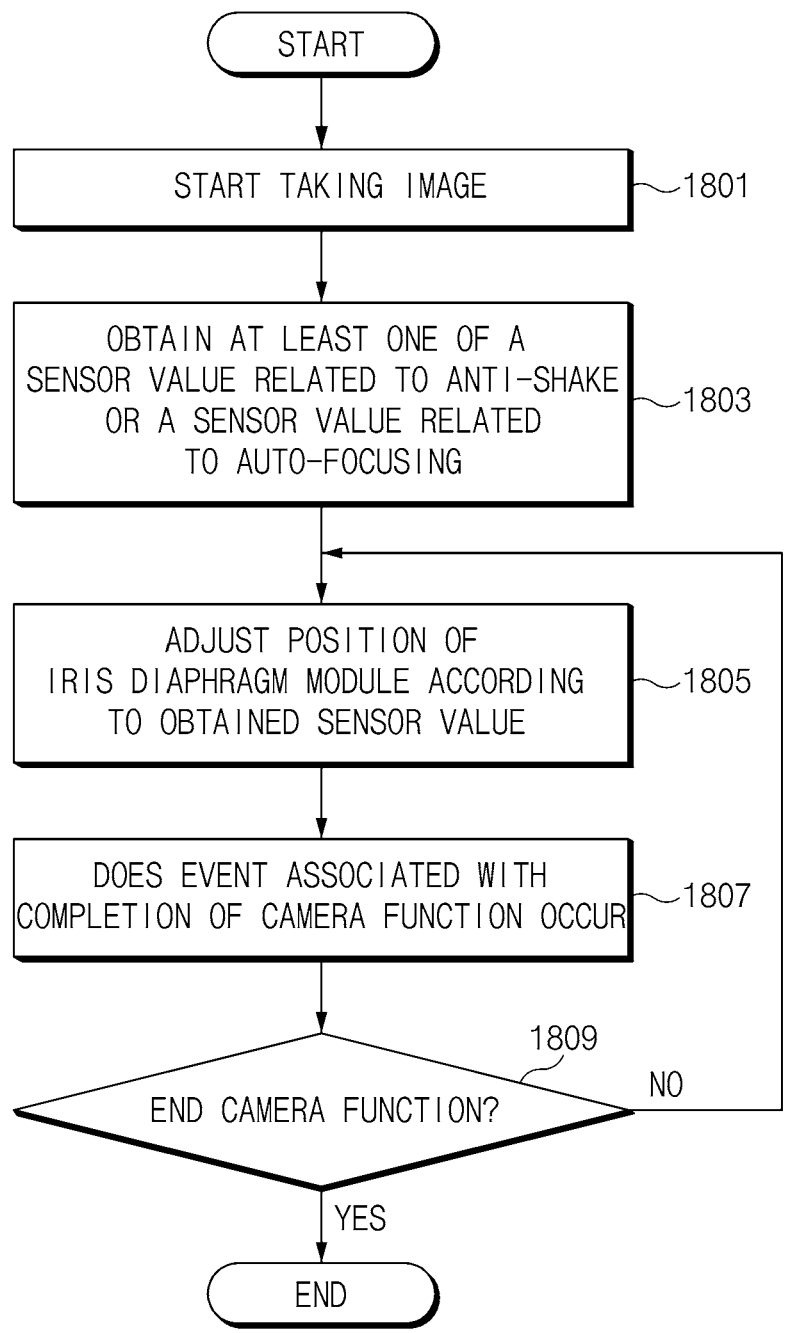
FIG. 18A is a view illustrating an example of an electronic device operating method related to a camera module according to an embodiment of the disclosure.

FIG. 18A is a view illustrating an example of an electronic device operating method related to a camera module according to an embodiment of the disclosure.

Referring to FIGS. 1, 17, and 18A, at operation 1801 the electronic device operating method may activate a camera module according to a user input or according to set scheduling information and may start to take an image. In this operation, a processor of the electronic device may control supply of power to the camera module to cause the camera module to be ready to start taking an image.

When the camera module starts to take an image, the processor 1720 (or the control circuitry 101) may collect the image according to a preview mode. In this regard, at operation 1803, the processor 1720 may obtain at least one of a sensor value related to anti-shake and a sensor value related to auto-focusing. For example, the processor 1720 may collect a sensor value from at least one of a first Hall sensor (e.g., the first Hall sensor 141_2 of FIG. 1) that senses a movement of the lens 161 in the X-axis direction, a second Hall sensor (e.g., the second Hall sensor 142_2 of FIG. 1) that senses a movement of the lens 161 in the Y-axis direction, a third Hall sensor (e.g., the third Hall sensor 143_2 of FIG. 1) for AF that senses a movement of the lens 161 in the Z-axis direction. According to an embodiment, the processor 1720 may obtain only sensing information of the first Hall sensor that senses a movement of the lens 161 in the direction of the X-axis that corresponds to the same axis as the axis along which an iris diaphragm driving member (or an iris diaphragm magnet member) is arranged.

At operation 1805, the processor 1720 may adjust the position of the iris diaphragm module 200 according to the obtained sensor value. According to an embodiment, the processor 1720 may apply a sensing value received from the first Hall sensor 141_2 to the iris diaphragm Hall sensor 250_2 to cause the iris diaphragm module 200 to maintain a set position. For example, when OIS is performed by a first distance in a first direction (e.g., +X-axis direction), the processor 1720 may move the iris diaphragm module 200 by the first distance in a second direction (e.g., −X-axis direction) to cause the iris diaphragm module 200 to maintain the set position.

According to various embodiments, when sensing values are received from both the first Hall sensor 141_2 and the second Hall sensor 142_2, the processor 1720 may apply all the received sensing values to the iris diaphragm Hall sensor 250_2 to cause the iris diaphragm module 200 to maintain the set position. Alternatively, in the state in which an electric current of first magnitude is supplied through the iris diaphragm coil 250_1 such that the aperture ratio of the aperture 220a of the iris diaphragm module 200 has a first ratio (e.g., a predetermined percentage of the maximum or minimum magnitude), when the lens assembly 130, the first carrier 170 in which the lens assembly 130 is mounted, or the second carrier 180 is moved in the X-axis or Y-axis direction by OIS and therefore the gap between the iris Hall sensor 250_2 and the iris diaphragm magnet member is changed differently from that in the previous state, the processor 1720 may supply an electric current of second magnitude different from the first magnitude to the iris diaphragm coil 250_1 to cause the aperture ratio of the aperture 220a to be maintained at the first ratio. In this operation, the electronic device 1700 may store a mapping table (or a lookup table) in which sensing information obtained with regard to OIS and the amount of electric current to be supplied are mapped, and may determine the magnitude of electric current to be supplied to the iris diaphragm coil 250_1, based on the mapping table.

According to various embodiments, the mapping table stored in the memory 1730 of the electronic device 1700 may include a first table in which sensor values from the first Hall sensor 141_2 and electric current signal values corresponding thereto are mapped and a second table in which sensor values from the second Hall sensor 142_2 and electric current signal values corresponding thereto are mapped. In this case, the processor 1720 may obtain an electric current signal value from at least one of the first table and the second table in real time in response to a received signal (e.g., a sensor signal value transferred from the first Hall sensor 141_2 or the second Hall sensor 142_2) and may determine an electric current signal value to be applied to the iris diaphragm coil 250_1, based on the obtained electric current signal value.

According to various embodiments, without using a separate lookup table, the processor 1720 may calculate, in real time, an electric current signal value to be applied to the iris diaphragm coil 250_1 and may apply the calculated electric current signal value to the iris diaphragm coil 250_1 to correspond to a value obtained from the first Hall sensor 141_2 (or, the first Hall sensor 141_2 and the second Hall sensor 142_2 or the first to third Hall sensors 141_2, 142_2, and 143_2).

According to various embodiments, the camera module may include a plurality of iris diaphragm Hall sensors 250_2. In this case, the control circuit 101 or processor 1720 may calculate the accurate position of the iris diaphragm magnet member, based on sensing information obtained from the plurality of iris diaphragm Hall sensors 250_2. The control circuit 101 or processor 1720 may determine a specified position where the iris diaphragm magnet member has to be located (e.g., the position of the iris diaphragm magnet member that corresponds to a set aperture ratio of the iris diaphragm), based on the calculated position information and may adjust the amount of electric current to be supplied to the iris diaphragm coil such that the iris diaphragm magnet member is moved to the specified position.

At operation 1807, the processor 1720 may determine whether an event associated with completion of the camera function occurs. When the event associated with completion of the camera function occurs, the processor 1720 may, at operation 1809, end the camera function. When no event associated with completion of the camera function occurs, the processor 1720 may return to operation 1803 and may perform the following operations again.

According to various embodiments, the processor 1720 may obtain only a sensor value related to anti-shake because a Z-axis movement related to AF has a relatively minor effect (or a negligible effect) on a movement of the iris diaphragm driving member as mentioned above.

Figure 18B:
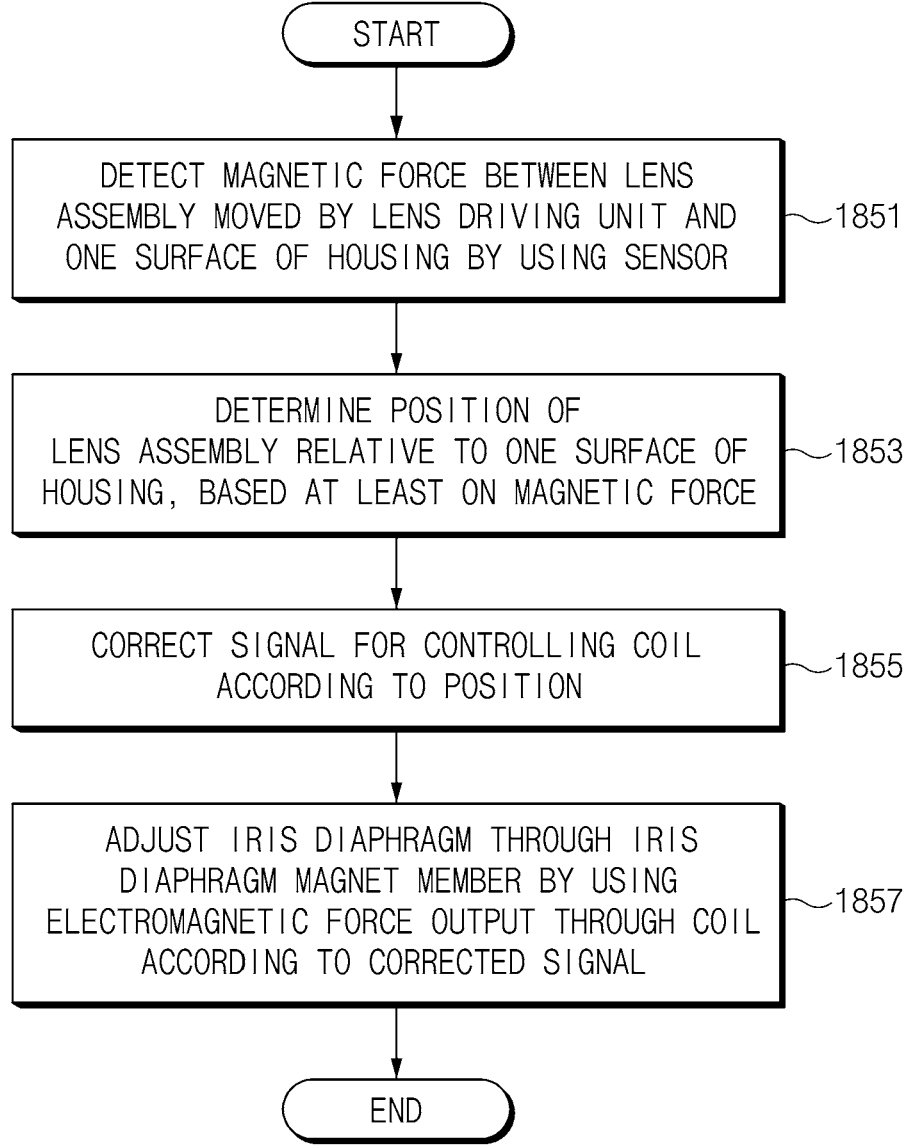
FIG. 18B is a view illustrating another example of an electronic device operating method related to a camera module according to an embodiment of the disclosure.

FIG. 18B is a view illustrating another example of an electronic device operating method related to a camera module according to an embodiment of the disclosure.

Referring to FIGS. 1, 17, and 18B, in a method of operating a camera module and an electronic device including the same, in which the camera module includes a lens driving unit (e.g., a device for moving the lens), a lens assembly, at least one coil for moving the lens assembly, an iris diaphragm magnet member disposed in a position facing the at least one coil, and an iris diaphragm moved by the iris diaphragm magnet member, the processor 1720 of the electronic device may, at operation 1851, detect a magnetic force between the lens assembly moved by the lens driving unit and one surface of a housing by using a sensor.

At operation 1853, the processor 1720 may determine the position of the lens assembly relative to the one surface of the housing, based at least on the detected magnetic force.

At operation 1855, the processor 1720 may correct a signal for controlling the coil according to the position of the lens assembly.

At operation 1857, the processor 1720 may perform control to adjust the iris diaphragm through the iris diaphragm magnet member, by using an electromagnetic force output through the coil according to the corrected signal.

Figure 19:
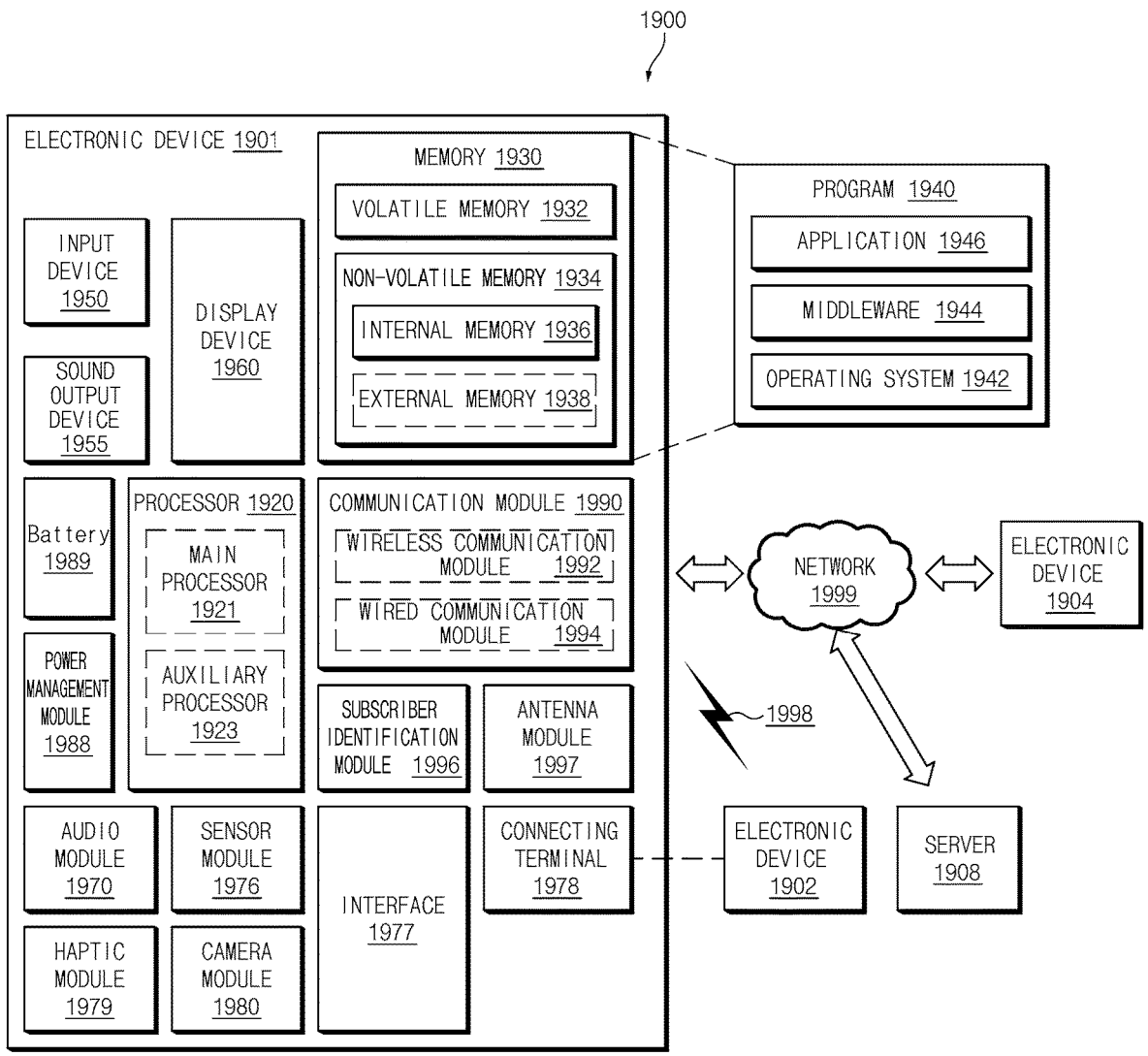
FIG. 19 is a view illustrating an operating environment of an electronic device including a camera module according to an embodiment of the disclosure.

FIG. 19 is a view illustrating an operating environment of an electronic device including a camera module according to an embodiment of the disclosure.

Referring to FIG. 19, the electronic device 1901 (e.g., the electronic device 1700) in a network environment 1900 may communicate with an electronic device 1902 via a first network 1998 (e.g., a short-range wireless communication network), or an electronic device 1904 or a server 1908 via a second network 1999 (e.g., a long-range wireless communication network). According to an embodiment, the electronic device 1901 may communicate with the electronic device 1904 via the server 1908. According to an embodiment, the electronic device 1901 may include a processor 1920, memory 1930, an input device 1950, a sound output device 1955, a display device 1960, an audio module 1970, a sensor module 1976, an interface 1977, a haptic module 1979, a camera module 1980, a power management module 1988, a battery 1989, a communication module 1990, a subscriber identification module (SIM) 1996, or an antenna module 1997. In some embodiments, at least one (e.g., the display device 1960 or the camera module 1980) of the components may be omitted from the electronic device 1901, or one or more other components may be added in the electronic device 1901. In some embodiments, some of the components may be implemented as single integrated circuitry. For example, the sensor module 1976 (e.g., a fingerprint sensor, an iris sensor, or an illuminance sensor) may be implemented as embedded in the display device 1960 (e.g., a display).

The processor 1920 may execute, for example, software (e.g., a program 1940) to control at least one other component (e.g., a hardware or software component) of the electronic device 1901 coupled with the processor 1920, and may perform various data processing or computation. According to one embodiment, as at least part of the data processing or computation, the processor 1920 may load a command or data received from another component (e.g., the sensor module 1976 or the communication module 1990) in volatile memory 1932, process the command or the data stored in the volatile memory 1932, and store resulting data in non-volatile memory 1934. According to an embodiment, the processor 1920 may include a main processor 1921 (e.g., a central processing unit (CPU) or an application processor (AP)), and an auxiliary processor 1923 (e.g., a graphics processing unit (GPU), an image signal processor (ISP), a sensor hub processor, or a communication processor (CP)) that is operable independently from, or in conjunction with, the main processor 1921. Additionally or alternatively, the auxiliary processor 1923 may be adapted to consume less power than the main processor 1921, or to be specific to a specified function. The auxiliary processor 1923 may be implemented as separate from, or as part of the main processor 1921.

The auxiliary processor 1923 may control at least some of functions or states related to at least one component (e.g., the display device 1960, the sensor module 1976, or the communication module 1990) among the components of the electronic device 1901, instead of the main processor 1921 while the main processor 1921 is in an inactive (e.g., sleep) state, or together with the main processor 1921 while the main processor 1921 is in an active state (e.g., executing an application). According to an embodiment, the auxiliary processor 1923 (e.g., an ISP or a CP) may be implemented as part of another component (e.g., the camera module 1980 or the communication module 1990) functionally related to the auxiliary processor 1923.

The memory 1930 may store various data used by at least one component (e.g., the processor 1920 or the sensor module 1976) of the electronic device 1901. The various data may include, for example, software (e.g., the program 1940) and input data or output data for a command related thereto. The memory 1930 may include the volatile memory 1932 or the non-volatile memory 1934.

The program 1940 may be stored in the memory 1930 as software, and may include, for example, an operating system (OS) 1942, middleware 1944, or an application 1946.

The input device 1950 may receive a command or data to be used by another component (e.g., the processor 1920) of the electronic device 1901, from the outside (e.g., a user) of the electronic device 1901. The input device 1950 may include, for example, a microphone, a mouse, a keyboard, or a digital pen (e.g., a stylus pen).

The sound output device 1955 may output sound signals to the outside of the electronic device 1901. The sound output device 1955 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 1960 may visually provide information to the outside (e.g., a user) of the electronic device 1901. The display device 1960 may include, for example, a display, a hologram device, or a projector and control circuitry to control a corresponding one of the display, hologram device, and projector. According to an embodiment, the display device 1960 may include touch circuitry adapted to detect a touch, or sensor circuitry (e.g., a pressure sensor) adapted to measure the intensity of force incurred by the touch.

The audio module 1970 may convert a sound into an electrical signal and vice versa. According to an embodiment, the audio module 1970 may obtain the sound via the input device 1950, or output the sound via the sound output device 1955 or a headphone of an external electronic device (e.g., an electronic device 1902) directly (e.g., wiredly) or wirelessly coupled with the electronic device 1901.

The sensor module 1976 may detect an operational state (e.g., power or temperature) of the electronic device 1901 or an environmental state (e.g., a state of a user) external to the electronic device 1901, and then generate an electrical signal or data value corresponding to the detected state. According to an embodiment, the sensor module 1976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1977 may support one or more specified protocols to be used for the electronic device 1901 to be coupled with the external electronic device (e.g., the electronic device 1902) directly (e.g., wiredly) or wirelessly. According to an embodiment, the interface 1977 may include, for example, a high definition multimedia interface (HDMI), a universal serial bus (USB) interface, a secure digital (SD) card interface, or an audio interface.

A connecting terminal 1978 may include a connector via which the electronic device 1901 may be physically connected with the external electronic device (e.g., the electronic device 1902). According to an embodiment, the connecting terminal 1978 may include, for example, a HDMI connector, a USB connector, a SD card connector, or an audio connector (e.g., a headphone connector).

The haptic module 1979 may convert an electrical signal into a mechanical stimulus (e.g., a vibration or a movement) or electrical stimulus which may be recognized by a user via his tactile sensation or kinesthetic sensation. According to an embodiment, the haptic module 1979 may include, for example, a motor, a piezoelectric element, or an electric stimulator.

The camera module 1980 may capture a still image or moving images. According to an embodiment, the camera module 1980 may include one or more lenses, image sensors, ISP, or flashes.

The power management module 1988 may manage power supplied to the electronic device 1901. According to one embodiment, the power management module 1988 may be implemented as at least part of, for example, a power management integrated circuit (PMIC).

The battery 1989 may supply power to at least one component of the electronic device 1901. According to an embodiment, the battery 1989 may include, for example, a primary cell which is not rechargeable, a secondary cell which is rechargeable, or a fuel cell.

The communication module 1990 may support establishing a direct (e.g., wired) communication channel or a wireless communication channel between the electronic device 1901 and the external electronic device (e.g., the electronic device 1902, the electronic device 1904, or the server 1908) and performing communication via the established communication channel. The communication module 1990 may include one or more CP that are operable independently from the processor 1920 (e.g., the AP) and supports a direct (e.g., wired) communication or a wireless communication. According to an embodiment, the communication module 1990 may include a wireless communication module 1992 (e.g., a cellular communication module, a short-range wireless communication module, or a global navigation satellite system (GNSS) communication module) or a wired communication module 1994 (e.g., a local area network (LAN) communication module or a power line communication (PLC) module). A corresponding one of these communication modules may communicate with the external electronic device via the first network 1998 (e.g., a short-range communication network, such as Bluetooth™, wireless-fidelity (Wi-Fi) direct, or infrared data association (IrDA)) or the second network 1999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1992 may identify and authenticate the electronic device 1901 in a communication network, such as the first network 1998 or the second network 1999, using subscriber information (e.g., international mobile subscriber identity (IMSI)) stored in the subscriber identification module 1996.

The antenna module 1997 may transmit or receive a signal or power to or from the outside (e.g., the external electronic device) of the electronic device 1901. According to an embodiment, the antenna module 1997 may include an antenna including a radiating element composed of a conductive material or a conductive pattern formed in or on a substrate (e.g., PCB). According to an embodiment, the antenna module 1997 may include a plurality of antennas. In such a case, at least one antenna appropriate for a communication scheme used in the communication network, such as the first network 1998 or the second network 1999, may be selected, for example, by the communication module 1990 (e.g., the wireless communication module 1992) from the plurality of antennas. The signal or the power may then be transmitted or received between the communication module 1990 and the external electronic device via the selected at least one antenna. According to an embodiment, another component (e.g., a radio frequency integrated circuit (RFIC)) other than the radiating element may be additionally formed as part of the antenna module 1997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1901 and the external electronic device 1904 via the server 1908 coupled with the second network 1999. Each of the electronic devices 1902 and 1904 may be a device of a same type as, or a different type, from the electronic device 1901. According to an embodiment, all or some of operations to be executed at the electronic device 1901 may be executed at one or more of the external electronic devices 1902, 1904, or 1908. For example, if the electronic device 1901 should perform a function or a service automatically, or in response to a request from a user or another device, the electronic device 1901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1901. The electronic device 1901 may provide the outcome, with or without further processing of the outcome, as at least part of a reply to the request. To that end, a cloud computing, distributed computing, or client-server computing technology may be used, for example.

The sensor module 1976 of the electronic device 1901 may include a biometric sensor disposed below the display 1960. The biometric sensor may include, for example, a sensor driven by an ultrasonic method. The biometric sensor may irradiate ultrasonic waves in an upward direction (e.g., above a cover glass or external cover) from below the display 1960 (e.g., a rear surface of the display 1960). The biometric sensor may be fixed to the rear surface of the display 1960.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related components. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if a component (e.g., a first component) is referred to, with or without the term "operatively" or "communicatively," as "coupled with," "coupled to," "connected with," or "connected to" another component (e.g., a second component), it means that the component may be coupled with the other component directly (e.g., wiredly), wirelessly, or via a third component.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1940) including one or more instructions that are stored in a storage medium (e.g., internal memory 1936 or external memory 1938) that is readable by a machine (e.g., the electronic device 1901). For example, a processor (e.g., the processor 1920) of the machine (e.g., the electronic device 1901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, various embodiments may provide a camera module having various photographing modes or photographing functions by disposing an iris diaphragm module while minimizing an increase in the thickness of an electronic device.

Various embodiments support improving the photographing performance of a camera module and providing various photographing functions by linearly controlling a change in the aperture ratio of an iris diaphragm module.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A camera module comprising:
   a housing;
   a lens assembly, at least a part of which is received in the housing, the lens assembly including at least one lens;
   an iris diaphragm disposed over the at least one lens and configured to adjust an amount of external light incident on the at least one lens;
   an iris diaphragm magnet member disposed on a surface of the lens assembly and associated with adjusting a movement of the iris diaphragm;
   a coil disposed on a surface of the housing and configured to face the iris diaphragm magnet member;
   at least one sensor disposed on the surface of the housing and configured to sense a magnetic force of the iris diaphragm magnet member;
   a lens driving unit configured to move the lens assembly; and
   control circuitry operatively connected to the at least one sensor and the lens driving unit,
   wherein the control circuitry is configured to:
      detect the magnetic force between the lens assembly moved by the lens driving unit and the surface of the housing by using the sensor,
      determine the position of the lens assembly relative to the surface of the housing, based on the magnetic force,
      correct a signal for controlling the coil according to the position of the lens assembly, and
      adjust the iris diaphragm through the iris diaphragm magnet member, by using an electromagnetic force output through the coil according to the corrected signal.

2. The camera module of claim 1,
   wherein the lens driving unit includes:
      a first magnet member and a first Hall sensor configured to detect movement in a first axial direction with regard to optical image stabilization, and a second magnet member and a second Hall sensor configured to detect movement in a second axial direction with regard to the optical image stabilization, wherein the first axial direction and the second axial direction are perpendicular to a third axial direction that the lens faces, wherein the control circuitry is further configured to obtain the sensing information including the magnetic force from the first Hall sensor, and wherein the first magnet member is disposed on the same axis as the iris diaphragm magnet member.

3. The camera module of claim 2, wherein the control circuitry is further configured to apply the sensing information to correct a position of the iris diaphragm magnet member.

4. The camera module of claim 3, wherein the control circuitry is further configured to calculate a signal value to be applied to the coil to correspond to the sensing information, based on a lookup table stored in a memory.

5. The camera module of claim 1, wherein the lens driving unit includes:
 a first magnet member and a first Hall sensor configured to detect movement in a first axial direction with regard to optical image stabilization, and
 a second magnet member and a second Hall sensor configured to detect movement in a second axial direction with regard to the optical image stabilization, and wherein the control circuitry is further configured to obtain sensing information including the magnetic force from the first Hall sensor and the second Hall sensor.

6. The camera module of claim 5, wherein the control circuitry is further configured to apply the sensing information to correct a position of the iris diaphragm magnet member.

7. The camera module of claim 1, wherein the control circuitry is further configured to calculate a signal value to be applied to the coil to correspond to sensing information including the magnetic force, based on a lookup table stored in a memory.

8. The camera module of claim 1, wherein the lens driving unit includes:
 a first magnet member and a first Hall sensor configured to detect movement in a first axial direction with regard to optical image stabilization,
 a second magnet member and a second Hall sensor configured to detect movement in a second axial direction with regard to the optical image stabilization, and
 a third magnet member and a third Hall sensor configured to detect movement in a third axial direction with regard to auto-focusing, and wherein the control circuitry is further configured to:
  obtain sensing information including the magnetic force from the first Hall sensor, the second Hall sensor, and the third Hall sensor, and
  apply the obtained sensing information to correct a position of the iris diaphragm magnet member.

9. The camera module of claim 1, wherein the iris diaphragm includes:
 an iris diaphragm blade part including a plurality of blades,
 an iris diaphragm ring on which the iris diaphragm blade part is mounted, and
 an iris diaphragm holder on which the iris diaphragm ring is mounted, and wherein the iris diaphragm magnet member moves the iris diaphragm holder within a predetermined range.

10. The camera module of claim 9, wherein the iris diaphragm blade part includes:
 six blades disposed to adjust a size of an aperture in a center while rotating each blade through a predetermined angle.

11. A mobile electronic device comprising:
a camera module;
a memory; and
a processor operatively connected to the camera module and the memory, wherein the camera module includes:
 a housing,
 a lens assembly, at least a part of which is received in the housing, the lens assembly including at least one lens,
 an iris diaphragm disposed over the at least one lens and configured to adjust an amount of external light incident on the at least one lens,
 an iris diaphragm magnet member disposed on a surface of the lens assembly and associated with adjusting a movement of the iris diaphragm,
 a coil disposed on a surface of the housing and configured to face the iris diaphragm magnet member,
 at least one sensor disposed on the surface of the housing and configured to sense a magnetic force of the iris diaphragm magnet member,
 a lens driving unit configured to move the lens assembly, and
 control circuitry operatively connected to the at least one sensor, the lens driving unit, and the coil, and wherein the control circuitry is configured to detect the magnetic force between the lens assembly moved by the lens driving unit and the surface of the housing by using the sensor, determine the position of the lens assembly relative to the surface of the housing, based on the magnetic force, correct a signal for controlling the coil according to the position of the lens assembly, and adjust the iris diaphragm through the iris diaphragm magnet member, by using an electromagnetic force output through the coil according to the corrected signal.

12. The mobile electronic device of claim 11, wherein the control circuitry is further configured to:
 obtain sensing information including the magnetic force according to movement of the lens assembly; and
 calculate a signal to be supplied to the coil, based on the sensing information.

13. The mobile electronic device of claim 11, wherein the lens driving unit includes:
 a first magnet member and a first Hall sensor configured to detect movement in a first axial direction with regard to optical image stabilization, and
 a second magnet member and a second Hall sensor configured to detect movement in a second axial direction with regard to the optical image stabilization, wherein the control circuitry is further configured to obtain sensing information including the magnetic force from the first Hall sensor and apply the sensing information to correct a position of the iris diaphragm magnet member, and wherein the first magnet member is disposed on the same axis as the iris diaphragm magnet member.

14. The mobile electronic device of claim 13, wherein the control circuitry is further configured to calculate a signal value to be applied to the coil to correspond to the sensing information, based on a lookup table stored in the memory.

15. The mobile electronic device of claim 11,
wherein the lens driving unit includes:
- a first magnet member and a first Hall sensor configured to detect movement in a first axial direction with regard to optical image stabilization, and
- a second magnet member and a second Hall sensor configured to detect movement in a second axial direction with regard to the optical image stabilization, and wherein the control circuitry is further configured to obtain sensing information including the magnetic force from the first Hall sensor and the second Hall sensor.

16. The mobile electronic device of claim 15, wherein the control circuitry is further configured to calculate a signal value to be applied to the coil to correspond to the sensing information, based on a lookup table stored in the memory.

17. The mobile electronic device of claim 11,
wherein the lens driving unit includes:
- a first magnet member and a first Hall sensor configured to detect movement in a first axial direction with regard to optical image stabilization,
- a second magnet member and a second Hall sensor configured to detect movement in a second axial direction with regard to the optical image stabilization, and
- a third magnet member and a third Hall sensor configured to detect movement in a third axial direction with regard to auto-focusing, and wherein the control circuitry is further configured to:

obtain sensing information including the magnetic force from the first Hall sensor, the second Hall sensor, and the third Hall sensor, and apply the obtained sensing information to correct a position of the iris diaphragm magnet member.

\* \* \* \* \*